US012106122B2

(12) United States Patent
Muthukrishnan et al.

(10) Patent No.: US 12,106,122 B2
(45) Date of Patent: Oct. 1, 2024

(54) GENERATING A HIERARCHICAL DATA STRUCTURE THAT REPRESENTS A LOG

(71) Applicant: Oracle International Corporation, Redwood Shores, CA (US)

(72) Inventors: Nagarajan Muthukrishnan, Foster City, CA (US); Ravi Shankar Thammaiah, Redwood City, CA (US); Sumanta Kumar Chatterjee, Menlo Park, CA (US); Binoy Sukumaran, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/459,287

(22) Filed: Aug. 31, 2023

(65) Prior Publication Data
US 2023/0409351 A1    Dec. 21, 2023

Related U.S. Application Data

(63) Continuation of application No. 17/703,301, filed on Mar. 24, 2022, now Pat. No. 11,822,939.

(51) Int. Cl.
*G06F 9/445*            (2018.01)
(52) U.S. Cl.
CPC ................ *G06F 9/44526* (2013.01)
(58) Field of Classification Search
None
See application file for complete search history.

(56) References Cited

U.S. PATENT DOCUMENTS

| | | |
|---|---|---|
| 6,898,737 B2 | 5/2005 | Goeller et al. |
| 7,231,550 B1 | 6/2007 | McGuire et al. |
| 9,772,934 B2 | 9/2017 | Maag et al. |
| (Continued) | | |

FOREIGN PATENT DOCUMENTS

| | | |
|---|---|---|
| CN | 108268485 A | 7/2018 |
| CN | 112667426 A | 4/2021 |

OTHER PUBLICATIONS

"Centralize, transform & stash your data," Logtash, Retrieved at https://www.elastic.co/logstash/, Retrieved on Apr. 2022, pp. 7.
(Continued)

*Primary Examiner* — Umut Onat
(74) *Attorney, Agent, or Firm* — Invoke

(57) ABSTRACT

Plugins that are independently written are executed in a collaborative manner to analysis a log. A plugin executing with respect to a particular node of a hierarchical data structure determines values for a set of keys based on information of the particular node and/or any ancestor nodes, and information stored in a shared repository. The plugin stores the values for the keys as additional information of the particular hierarchical node and/or into the shared repository. The plugin does not access information of non-ancestor nodes when executing with respect to the particular hierarchical node. Each plugin writes into and retrieves from the shared repository using the shared naming convention, thereby sharing information. The sequence of execution of the plugins is not dependent on dependencies amongst the plugins. If a dependent plugin requiring an output from a requisite plugin is first executed, the dependent plugin is flagged as pending and subsequently re-executed.

20 Claims, 23 Drawing Sheets

(56) References Cited

U.S. PATENT DOCUMENTS

| | | | |
|---|---|---|---|
| 10,976,948 | B1 | 4/2021 | Lee et al. |
| 11,822,939 | B2 | 11/2023 | Muthukrishnan et al. |
| 11,914,563 | B2 | 2/2024 | Muthukrishnan et al. |
| 2003/0191739 | A1 | 10/2003 | Chatterjee et al. |
| 2003/0229677 | A1 | 12/2003 | Allan |
| 2012/0054472 | A1 | 3/2012 | Altman et al. |
| 2013/0007776 | A1* | 1/2013 | Kwong ............... G06F 9/44526 719/330 |
| 2014/0081901 | A1 | 3/2014 | Szymczak |
| 2014/0082072 | A1 | 3/2014 | Kass et al. |
| 2015/0296025 | A1* | 10/2015 | Okabayashi .......... H04L 67/141 709/201 |
| 2017/0091241 | A1 | 3/2017 | Pashenkov et al. |
| 2017/0161351 | A1 | 6/2017 | Stringham |
| 2018/0018613 | A1 | 1/2018 | Richardson et al. |
| 2018/0114190 | A1 | 4/2018 | Borrel et al. |
| 2018/0181415 | A1 | 6/2018 | Balkan et al. |
| 2019/0044898 | A1 | 2/2019 | Shioya et al. |
| 2019/0361896 | A1 | 11/2019 | Brunets et al. |
| 2020/0111255 | A1 | 4/2020 | Brodsky et al. |
| 2022/0300505 | A1* | 9/2022 | Wang .................. G06F 16/1805 |
| 2023/0031997 | A1 | 2/2023 | Kulkarni et al. |
| 2023/0229597 | A1 | 7/2023 | Michaelis et al. |
| 2023/0409350 | A1 | 12/2023 | Muthukrishnan et al. |

OTHER PUBLICATIONS

"Creating better incident timelines (and why they matter)," Retrieved at https://www.atlassian.com/incident-management/postmortem/timelines, Retrieved on Apr. 2022, pp. 3.

"Incident Management plugins," Servicenow, Retrieved at https://docs.servicenow.com/bundle/rome-it-service-management/page/product/incident-management/concept/incident-mgmt-plugins.html, Retrieved on Apr. 2022, pp. 2.

"Incident Management process," Servicenow, Retrieved at https://docs.servicenow.com/bundle/rome-it-service-management/page/product/incident-management/concept/incident-management-process.html, Retrieved on Apr. 2022, pp. 2.

"Incident postmortems," Retrieved at https://www.atlassian.com/incident-management/handbook/postmortems#/why-do-we-do-postmortems, Retrieved on Apr. 2022, pp. 19.

"Log Inspector," Retrieved at https://help.salesforce.com/s/articleView?id=sf.code_dev_console_view_system_log.htm&type=5, Retrieved on Apr. 2022, pp. 7.

"Using the Fault Analyzer plug-in," IBM, Retrieved at https://www.ibm.com/docs/en/adfz/fafz/14.1?topic=files-using-fault-analyzer-plug-in, Jun. 2021, pp. 1.

"What is incident management," Retrieved at https://www.atlassian.com/incident-management, Retrieved on Apr. 2022, pp. 7.

Chan A. et al, "An Efficient Format for Nearly Constant-Time Access to Arbitrary Time Intervals in Large Trace Files," Mathematics and Computer Science Division Argonne National Laboratory, 2007, pp. 16.

Gunestas. M. et al., "Log Analysis Using Temporal Logic and Reconstruction Approach: Web Server Case," JDFSL, vol. 11, Issue 2, 2016, pp. 35-58.

Leemans M. et al., "Recursion Aware Modeling and Discovery for Hierarchical Software Event Log Analysis," IEEE 25th International Conference on Software Analysis, Evolution and Reengineering (SANER), 2018, pp. 185-196.

Liblit B. et al., "Building a Better Backtrace: Techniques for Postmortem Program Analysis," Oct. 2022, pp. 12.

Munoz-Gama J. et al., "Hierarchical Conformance Checking of Process Models Based on Event Logs," Application and Theory of Petri Nets and Concurrency, 2013, pp. 291-310.

Stewart D. et al., "Safety Annex for the Architecture Analysis and Design Language," University of Minnesota, Department of Computer Science, 2018, pp. 10.

Whelan R J. et al., "Repeatable Reverse Engineering with the Platform for Architecture-Neutral Dynamic Analysis," Lincoln Laboratory Journal, vol. 22, Issue 1, 2016, pp. 90-99.

Yasmin F. A. et al., "Process Enhancement in Process Mining: A Literature Review," CEUR workshop proceedings, vol. 2270, 2018, pp. 65-72.

Zhang L. et al., "FaultTracer: A Change Impact and Regression Fault Analysis Tool for Evolving Java Programs," Proceedings of the ACM SIGSOFT 20th International Symposium on the Foundations of Software Engineering, 2012, pp. 4.

* cited by examiner

User Interface 1202

Node Data 1204

[TOC00001]
ORA-07445: exception encountered: core dump
[ksm_mga_heap_alloc_seg()+148]
[SIGBUS]
[ADDR:0x400140000008]
[PC:0x108BAF4]
[Non-existent physical address]
[ ]
[TOC00001-END]

Node Analysis Data 1206

ANALYSIS
BUS ERROR: Bus error (not a segment violation)
PHYSICAL_PAGE: OS cannot find underlying page. It can be due to out of memory issues or the file is empty for file based memory mapping segment
SYSTEM_MEMORY_ISSUE: Both Memory and Swap are 95+% occupied

INCIDENT
ADDRESS: 0x400140000008
ERROR: 7445
ERROR_ARG:
 0: ksm_mga_heap_alloc_seg()+148
 1: SIGBUS
 2: ADDR: 0x400140000008
 3: PC:0x108BAF4
 4: Non-existent physical address
ERROR_STR: ORA-7445: exception encountered: core dump
[ksm_mga_heap_alloc_seg()+148] [SIGBUS] [ADDR: 0x400140000008]
[PC: 0x108BAF4] [Non-existent physical address] [ ]

MAP

| | |
|---|---|
| INFO | Address 0x400140000008 is in mapped range:<br>400140000000-400160000000 rw-s 00000000 00:14 4187638168<br>/dev/shm/ora_ffffffd9a7e908_2ab708a87_9_KXTT_MGA_1_-2110384703_72089_0.dat |
| RANGE | 400100000000-400120000000 rw-s 00000000 00:14 3879678494<br>/dev/shm/ora_ffffffd9a7e908_2ab708a87_1_KSIPC_MGA_1_NMSPC_2_0_8.dat<br>400120000000-400140000000 rw-s 00000000 00:14 3953422280<br>/dev/shm/ora_ffffffd9a7e908_2ab708a87_1_KSIPC_MGA_1_NMSPC_2_0_9.dat<br>400140000000-400160000000 rw-s 00000000 00:14 4187638168<br>/dev/shm/ora_ffffffd9a7e908_2ab708a87_9_KXTT_MGA_1_-2110384703_72089_0.dat<br>7f5c6dbf8000-7f5c6dc3d000 r--s 001c8000 f9:00 1448633 /usr/lib64/libc-2.17.so |

Fig. 12A

User Interface
1212

Node Data 1214

[TOC00003]
--- Beginning of Customized Incident Dump(s)
Dumping swap information
Memory (Avail/Total) = 3859.19M/725212.65M
Swap (Avail/Total) = 0.00M/16384.00M
Exception [type: SIGBUS, Non-existent physical
address] [ADDR: 0x400140000008]
[PC:0x108BAF4,
ksm_mga_heap_alloc_seg()+148]
[flags: 0x0, count: 1]
Registers:
%rax: 0x0000400140000000
%rbx: 0x0000000000200000
%rcx: 0x00000007f3852dd8
%rdx: 0x0000000060daef1e8
%rdi: 0x00000007f3852d80
%rsi: 0x0000000060daef1e8
. . .
*** 2020-06-10T12:01:14.111172+00:00
ksm_mga_heap_alloc_seg()+136 (0x108bae8)
mov 0x208 (%r8),%r9
ksm_mga_heap_alloc_seg()+143 (0x108baef)
test %rax,%rax
ksm_mga_heap_alloc_seg()+146 (0x108baf2)
je 0x108bb08
> ksm_mga_heap_alloc_seg()+148 (0x108baf4)
mov %rbx,0x8(%rax)
ksm_mga_heap_alloc_seg()+152 (0x108baf8)
mov -0x8(%rbp),%rbx
ksm_mga_heap_alloc_seg()+156 (0x108bafc)
movq $0x4b1dde10,(%rax)
ksm_mga_heap_alloc_seg()+163 (0x108bb03)
mov %rbp,%rsp
. . .
*** 2020-06-10T12:01:14.146343+00:00
dbkedDefDump(): Starting a non-incident
diagnostic dump (flag: 0x3, level=3, mask 0x0)

Node Analysis Data 1216

| | | Arg | VAR | TYPE | ADDR | VALUE |
|---|---|---|---|---|---|---|
| ARG | | 0 | hd1 | ksm_mga_hdl_t * | 0x7f3852d80 | click to expand |
| | | 1 | reg_size_arg | sb4 | | 0x60daef1e8 |
| | | 2 | min_size_arg | sb4 | | 0x60daef1e8 |
| CALLEE | _sighandler() | | | | | |
| CALLER | ksm_mga_heap_alloc_seg()+148 | | | | | |
| CALLER-SOURCE | ksmmga.c:4383 | | | | | |
| CALLER-SOURCE2 | 4378: if (exth=NULL) /* creation failure or running out of memory*/<br>4379: return NULL;<br>4380<br>4381: /* Write the header and return the segment */<br>4382: ksm_mga_hpext_hdr_magic(exth) =<br>KSM_MGA_HPEXT_HDR_MAGIC;<br>4383: > ksm_mga_hpext_hdr_segsz(exth) = req_size;<br>4384<br>4385: return exth;<br>4386: }<br>4387<br>4388: /* --- ksm_mga_heap_add_seq: ---*/ | | | | | |

| Local Variable | TYPE | ADDR | VALUE |
|---|---|---|---|
| LOCAL | exth | ksm_mga_hpext_hdr_t * | 0x400140000000 | click to expand |
| | . . . | | | |

Fig. 12B

GENERATING A HIERARCHICAL DATA STRUCTURE THAT REPRESENTS A LOG

RELATED APPLICATIONS; INCORPORATION BY REFERENCE

The following application is hereby incorporated by reference: application Ser. No. 17/703,301 filed on Mar. 24, 2022. The Applicant hereby rescinds any disclaimer of claim scope in the parent application(s) or the prosecution history thereof and advises the USPTO that the claims in this application may be broader than any claim in the parent application(s).

This application is related to U.S. Non-Provisional patent application Ser. No. 17/703,269, filed on Mar. 24, 2022, titled "Data Structure Generation System for Analyzing Logs", which is hereby incorporated by reference.

TECHNICAL FIELD

The present disclosure relates to an analysis system for analyzing logs. In particular, the present disclosure relates to collaboratively executing independently-written plugins to analyze logs.

BACKGROUND

A computing system has a large number of hardware and/or software components, such as servers, data repositories, virtual machines, routers, databases, applications, threads. The components generate a large number of logs. The term "log" herein refers to a record of monitoring data (such as events, states, activities, errors) of one or more components. Logs may include, for example, a record of states generated at regular time intervals of a single component; a record of events generated based on triggering conditions; a record of monitoring data associated with tracing through an execution of an application and/or process, which may execute on one or more components (sometimes referred to as "traces"); a record of monitoring data at the time of an incident, which may involve one or more components. Monitoring data obtained from different components may be presented in different data formats.

The monitoring data serves as a basis for performing activities such as root cause analysis and predictive analysis used for understanding and/or improving the computing system. However, analyzing such a large volume of monitoring data is challenging. An error recorded at a certain line in a log may be due to a configuration change recorded many lines ahead in the log, or may be recorded in a different log altogether. Further, the skills and expertise necessary for reviewing different logs, or different lines within a same log, may be spread across different persons.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 12A-12B illustrate a representation of analysis data on a user interface in accordance with one or more embodiments.

DETAILED DESCRIPTION

Figure 1:
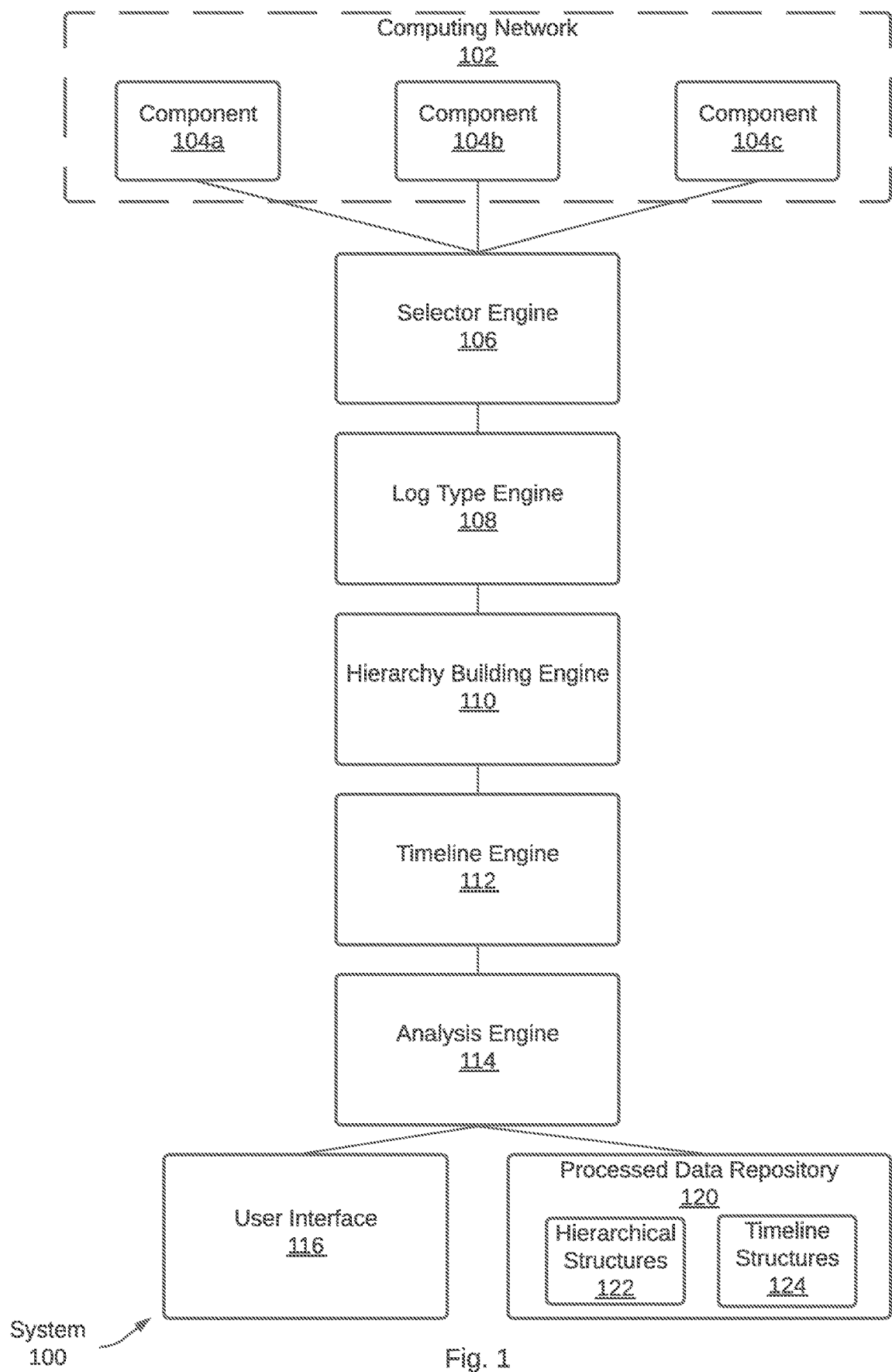
FIG. 1 illustrates a log analysis system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.
1. GENERAL OVERVIEW
2. LOG ANALYSIS SYSTEM ARCHITECTURE 3. GENERATING A HIERARCHICAL DATA STRUCTURE
4. GENERATING A TIMELINE DATA STRUCTURE
5. COLLABORATIVELY EXECUTING PLUGINS TO GENERATE A HIERARCHICAL DATA STRUCTURE
6. EXAMPLE EMBODIMENT
7. COMPUTER NETWORKS AND CLOUD NETWORKS
8. HARDWARE OVERVIEW
9. MISCELLANEOUS; EXTENSIONS 1. General Overview One or more embodiments include generating a hierarchical data structure comprising a plurality of hierarchical nodes based on a log obtained from one or more components of a computing system. The hierarchical data structure includes different kinds of hierarchical nodes, such as data nodes and anchor nodes. Data nodes have data comprising a log portion extracted from the log. Anchor nodes serve as parent nodes to data nodes and are not necessarily directly associated with any portions of the log. Each hierarchical node, whether a data node or an anchor node, may be associated with (a) metadata and/or (b) analysis data. The metadata and/or analysis data associated with a hierarchical node may be stored in the form of an annotation associated with the particular node. Information (data, metadata, and/or analysis data) of an ancestor node is imputed to a descendant node. Conversely, a descendant node inherits information (data, metadata, and/or analysis data) of an ancestor node. Hence, if metadata and/or analysis data of an ancestor node indicates that the ancestor node is associated with a particular component of a computing system, then each descendant node also has an inherited association with the particular component, even if such association is not indicated by metadata and/or analysis data of the descendant node itself. Additionally or alternatively, a plugin updating an ancestor node may explicitly update the descendant node with the same information.

One or more embodiments include generating a hierarchical data structure by executing a set of pre-processing plugins. A pre-processing plugin is configured to recognize a certain type of information from a log. Different pre-processing plugins recognize different types of information. To generate a hierarchical data structure, a set of pre-processing plugins are iteratively executed. One iteration involves executing each pre-processing plugin with respect to each hierarchical node within the hierarchical data structure at the time of execution. Initially, a hierarchical data structure includes a root hierarchical node. Data of the root hierarchical node includes at least a portion extracted from a target log. The first iteration of pre-processing plugins includes executing each pre-processing plugin with respect to the root hierarchical node. If a pre-processing plugin recognizes information from the log portion of the root hierarchical node, the pre-processing plugin creates at least two new hierarchical node. One new hierarchical node includes the recognized information; the other new hierarchical node includes the remainder of the log portion of the root hierarchical node. For each new hierarchical node, the pre-processing plugin specifies whether a new child node or a new sibling new is to be created. The root hierarchical node becomes an anchor node and is disassociated from any portions of the target log. A subsequent iteration of pre-processing plugins includes executing each pre-processing plugin with respect to the root hierarchical node as well as each hierarchical node that was created during the previous iteration(s). Iterations of the pre-processing plugins are hence performed until no more information is recognized by any of the pre-processing plugins. Hence, log portions are iteratively dissecting into smaller recognized sets of information.

Further, a pre-processing plugin is configured to determine metadata of a hierarchical node based on information of the hierarchical node and/or information stored in a shared repository. The metadata includes a node type and/or values for a set of keys or fields relevant to the hierarchical node. Examples of keys include range of line numbers, error code, mode or configurations, component identifier. Each node type may be associated with different keys. Different pre-processing plugin may determine values for different keys. The metadata of a hierarchical node may be stored as an annotation to the hierarchical node. Hence a hierarchy data structure includes dissected recognized set of information, arranged in a hierarchy, and associated or annotated with metadata.

One or more embodiments include generating one or more timeline data structures based on a hierarchical data structure representing a log. A timeline data structure references both an event type and a hierarchical node within the hierarchical data structure. The timeline data structure represents that an event of the referenced event type has been detected within the referenced hierarchical node. As described above, a descendant node inherits information of an ancestor node in a hierarchical data structure. Hence, a timeline data structure referencing a hierarchical node is associated with not only metadata and/or analysis data of the referenced hierarchical node but also metadata and/or analysis data of any ancestor nodes of the referenced hierarchical node. For example, a timeline data structure may have an association with a particular component of a computing system based on metadata and/or analysis data of an ancestor node of the referenced hierarchical node, even if association with the particular component is not indicated by metadata and/or analysis data of the referenced hierarchical node itself.

One or more embodiments include generating a timeline data structure by executing a set of timeline plugins. A timeline plugin is configured to detect whether a certain event type is within a hierarchical node based on an associated set of event attributes. The timeline plugin is executed with respect to each hierarchical node to determine whether information of the hierarchical node includes the associated event attributes. If the associated event attributes are found, the timeline plugin determines that the event type has been detected in the hierarchical node. The timeline plugin generates a timeline data structure that references both the event type and the hierarchical node. Each timeline plugin detects a different event type. Each timeline plugin is executed with respect to each hierarchical node.

One or more embodiments include generating analysis data for a hierarchical node within a hierarchical data structure based on information of one or more ancestor nodes to the hierarchical node. Information used for generating analysis data is expansive such that information of ancestor nodes is considered; but information used for generating analysis data is also restrictive such that information of non-ancestor nodes are not considered. In particular, performance of an analysis with respect to a particular hierarchical node may result in determination of certain values for a set of keys. The determined values for the keys may be stored into the particular hierarchical node, annotations to the particular hierarchical node, and/or a shared repository. However, the determined values for the keys cannot be stored within a different hierarchical node, or as annotations to a different hierarchical node. Further, performance of an analysis with respect to a particular hierarchical node may depend on information (data, metadata, and/or analysis data) of the particular hierarchical node and any ancestor nodes, and/or the shared repository. However, determination of a values for a key as part of an analysis with respect to the particular hierarchical node cannot be based on data and/or metadata of any non-ancestor nodes.

One or more embodiments include generating analysis data for a hierarchical node by executing a set of analysis plugins. An analysis plugin is configured to determine analysis data of a hierarchical node. Determining analysis data includes, for example, determining values for a set of keys relevant to the hierarchical node. The set of keys included as analysis data and the set of keys included as metadata, described above, may be same or different. Different analysis plugins may determine values for different keys. The values for the keys are determined based on information (data, metadata, and/or analysis data) of the hierarchical node under analysis, information of any ancestor nodes, and/or information stored in a shared repository. Each analysis plugin is executed with respect to each hierarchical node.

The set of analysis plugins share information by utilizing a shared repository and a shared naming convention. While field experts may independently write different analysis plugins, the experts use a shared naming convention for referencing certain keys. An expert writing an analysis plugin that outputs a particular key refers to the particular key using a particular name; the analysis plugin stores a value for the particular key into the shared repository using the particular name. Another expert writing another analysis plugin that accepts the particular key as input refers to the particular key using the same particular name; the analysis plugin retrieves the value for the particular key from the shared repository using the particular name. The shared naming convention thereby enables sharing of the particular generated value across the different plugins. A first analysis plugin that requires as input a value for a key output from a second analysis plugin may be said to have a "dependency" on the second analysis plugin; the first analysis plugin may be referred to as a "dependent" plugin, and the second analysis plugin may be referred to as a "requisite" plugin.

A set of analysis plugins may be executed in a sequence that is not necessarily determined based on dependencies amongst the analysis plugins. An expert writing an analysis plugin is not required to explicitly specify the analysis plugin's dependencies. In fact, an expert writing an analysis plugin is not necessarily aware of which specific plugin produces a value for a key required by the analysis plugin being written. Rather, during execution of a dependent plugin, if a value for a key that should have been output by a requisite plugin is not found, then the dependent plugin is flagged as "incomplete" and subsequently re-attempted. If the requisite plugin so happens to be executed before the second attempt at executing the dependent plugin, then the value for the key will be found, and the dependent plugin will successfully complete execution.

One or more embodiments described in this Specification and/or recited in the claims may not be included in this General Overview section.

2. Log Analysis System Architecture

FIG. 1 illustrates a log analysis system in accordance with one or more embodiments. As illustrated in FIG. 1, system 100 includes [ ]. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a computer network 102 provides connectivity among a set of components 104a-104c, also referred to as nodes. The components may be local to and/or remote from each other. The components are connected by a set of links. Additional embodiments and/or examples relating to computer networks are described below in Section 7, titled "Computer Networks and Cloud Networks."

In one or more embodiments, a component (such as any of components 104a-104c) may be any software and/or hardware. Examples of components include servers, data repositories, virtual machines, routers, databases, applications. One or more components may a generate a log. The term "log" herein refers to a record of monitoring data (such as events, states, activities, errors) of one or more components. Logs may include, for example, a record of states generated at regular time intervals of a single component; a record of events generated based on triggering conditions; a record of monitoring data associated with tracing through an execution of an application and/or process, which may execute on one or more components; a record of monitoring data at the time of an incident, which may involve one or more components. Monitoring data obtained from different components may be presented in different data formats.

Logs may be generated in any of a variety of manners. For example, a component (such as a built-in process of the component) may output a log for itself; an agent installed by a third-party application onto a component may monitor the component and output a log for the component; a log or log entry may be generated periodically; a log or log entry may be generated responsive to a trigger or condition; a single component may generate multiple logs or log entries simultaneously. Since the logs may be associated a variety of formats, sources, content, the logs may be referred to as "heterogenous logs."

In one or more embodiments, a selector engine 106 refers to hardware and/or software configured to perform operations described herein for identifying a relevant set of logs for analysis. Further details regarding a selector engine 106 are described below with reference to FIG. 2. Examples of operations for identifying a relevant set of logs for analysis are described below with reference to FIG. 13.

In one or more embodiments, a log type engine 108 refers to hardware and/or software configured to perform operations described herein for identifying one or more log types of each log. Further details regarding a log type engine 108 are described below with reference to FIG. 3. Examples of operations for identifying one or more log types of each log are described below with reference to FIG. 14.

In one or more embodiments, a hierarchy building engine 110 refers to hardware and/or software configured to perform operations described herein for generating a hierarchical data structure including metadata. Further details regarding a hierarchy building engine 110 are described below with reference to FIG. 4. Examples of operations for generating a hierarchical data structure including metadata are described below with reference to FIGS. 15A-15B.

In one or more embodiments, a timeline engine 112 refers to hardware and/or software configured to perform operations described herein for generating a timeline data structure and/or generating timeline reports based on timeline data structures. Further details regarding a timeline engine 112 are described below with reference to FIG. 6. Examples of operations for generating a timeline data structure are described below with reference to FIGS. 16A-16B. Examples of operations for generating and presenting a timeline report for a target component based on timeline data structures are described below with reference to FIG. 17.

In one or more embodiments, an analysis engine 114 refers to hardware and/or software configured to perform operations described herein for generating a hierarchical data structure including analysis data. Further details regarding an analysis engine 114 are described below with reference to FIG. 8. Examples of operations for generating a hierarchical data structure including analysis data are described below with reference to FIGS. 18A-18B.

A selector engine 106, a log type engine 108, a hierarchy building engine 110, a timeline engine 112, and/or an analysis engine 114 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, and/or a personal digital assistant (PDA).

A selector engine 106, a log type engine 108, a hierarchy building engine 110, a timeline engine 112, and/or an analysis engine 114 may employ one or more machine learning algorithms. A machine learning algorithm is an algorithm that can be iterated to learn a target model f that best maps a set of input variables to an output variable, using a set of training data. In an embodiment, training data for a machine learning algorithm includes datasets and associated labels. The datasets are associated with input variables for the target model f. The associated labels are associated with the output variable of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally or alternatively, a machine learning algorithm generates a target model f such that when the target model f is applied to the datasets of the training data, a maximum number of results determined by the target model f matches the labels of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

In one or more embodiments, a user interface 116 refers to hardware and/or software configured to facilitate communications between a user and any of a selector engine 106, a log type engine 108, a hierarchy building engine 110, a timeline engine 112, and/or an analysis engine 114. Examples of interfaces include a graphical user interface (GUI), a command line interface (CLI), a haptic interface, and a voice command interface. A GUI renders user interface elements and receives input via user interface elements. Examples of user interface elements include checkboxes, radio buttons, dropdown lists, list boxes, buttons, toggles, text fields, date and time selectors, command lines, sliders, pages, and forms.

In one or more embodiments, a processed data repository 120 is a data repository configured to store processed data from any of a selector engine 106, a log type engine 108, a hierarchy building engine 110, a timeline engine 112, and/or an analysis engine 114. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. Further, a data repository may be implemented or executed on the same computing system as any of a selector engine 106, a log type engine 108, a hierarchy building engine 110, a timeline engine 112, and/or an analysis engine 114. Alternatively or additionally, a data repository may be implemented or executed on a computing system separate from a selector engine 106, a log type engine 108, a hierarchy building engine 110, a timeline engine 112, and/or an analysis engine 114. The data repository may be communicatively coupled to a selector engine 106, a log type engine 108, a hierarchy building engine 110, a timeline engine 112, and/or an analysis engine 114 via a direct connection or via a network.

Information describing hierarchical structures 122 and/or timeline structures 124 may be implemented across any of components within the system 100. However, this information is illustrated within the processed data repository 120 for purposes of clarity and explanation. Hierarchical structures 122 are produced by a hierarchy building engine 110 and/or an analysis engine 114. Timeline structures 124 are produced by a timeline engine 112. Hierarchical structures 122 and timeline structures 124 are further described below, particularly with reference to FIGS. 5, 7, and 9.

Figure 2:
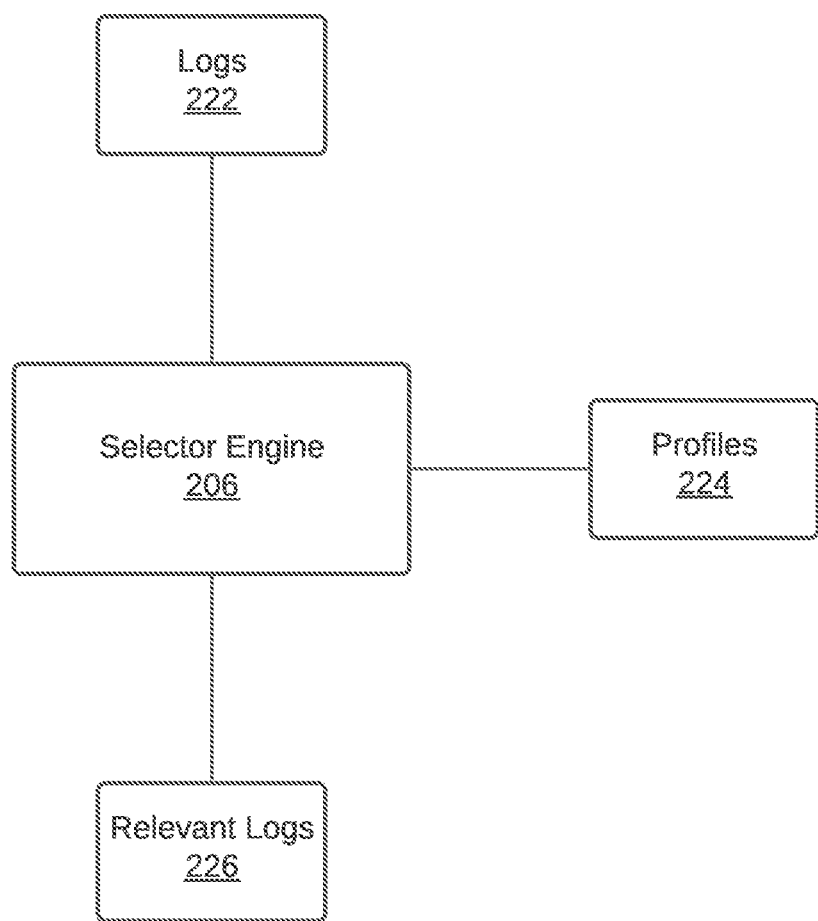
FIG. 2 illustrates a selector engine in accordance with one or more embodiments.

FIG. 2 illustrates a selector engine 206 in accordance with one or more embodiments. A set of logs 222 are generated by one or more components of a computer network and transmitted to a selector engine 206. A set of profiles 224 are stored in a data repository and accessible to the selector engine 206. A profile 224 indicates a set of log attributes of logs that are relevant to a particular problem type; logs not having the log attributes are likely not relevant to the particular problem type. Different profiles 224 may indicate log attributes relevant to different problem types. Examples of problem types include specific error codes or warning codes, errors with certain components of a computer network, and/or problems with specific geographical regions of a computer network. A profile 224 may be manually written and/or created or updated via machine learning.

A selector engine 206 identifies one or more problem types of interest. The selector engine 206 selects one or more profiles 224 associated with the problem types of interest. The selector engine 206 determines which of the logs 222 match at least one of the selected profiles 224. The determination may be made based on static code and/or a machine-learned model. The selector engine 206 classifies any logs 222 that match profiles 224 as relevant logs 226. The selector engine 206 hence filters the logs 222 to produce relevant logs 226.

Figure 3:
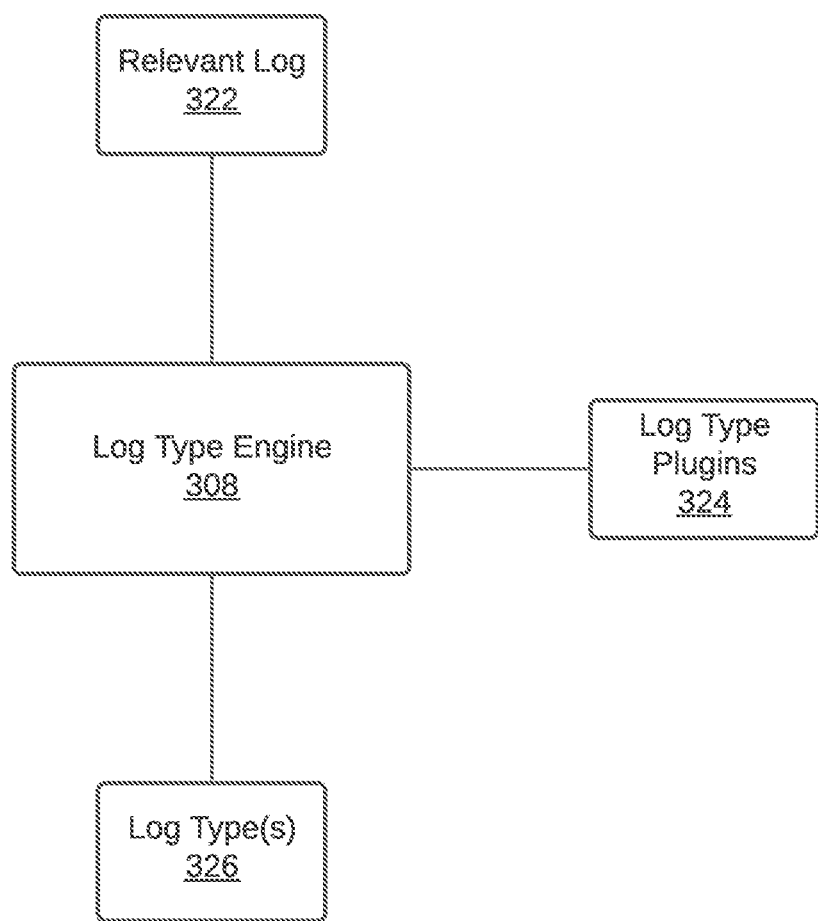
FIG. 3 illustrates a log type engine in accordance with one or more embodiments.

FIG. 3 illustrates a log type engine 308 in accordance with one or more embodiments. A set of relevant logs 322 (which may be identified by a selector engine 206 of FIG. 2) is transmitted to a log type engine 308. A set of log type plugins are stored in a data repository and accessible to the log type engine 308. A log type plugin 324 is configured to determine whether a log is of a particular log type 326. Different log type plugins 324 may be associated with different log types 326. Examples of log types 326 include alert logs, trace logs, event logs, incident logs. The log type plugins 324 may be written by one or more experts independent of each other. Additionally or alternatively, the log type plugins 324 may be written and/or updated via machine learning.

A log type engine 308 executes each log type plugin 324 with respect to each relevant log 322 to determine if the relevant log 322 is of the respective log type 326. The log type engine 308 thereby determines one or more log types 326 for each relevant log 322.

In an embodiment, logs of different log types 326 include timestamps in different formats. A log type 326 of a log may be used for parsing a timestamp within the log. As an example, a map between log types 326 and timestamp formats may be used to look up a timestamp format used in a particular log of a particular log type 326. As another example, different parsing algorithms may be associated with different log types 326. A particular log of a particular log type 326 is parsed using the parsing algorithm associated with the particular log type. Timestamps of logs of different log types may be converted to conform to a common format.

Figure 4:
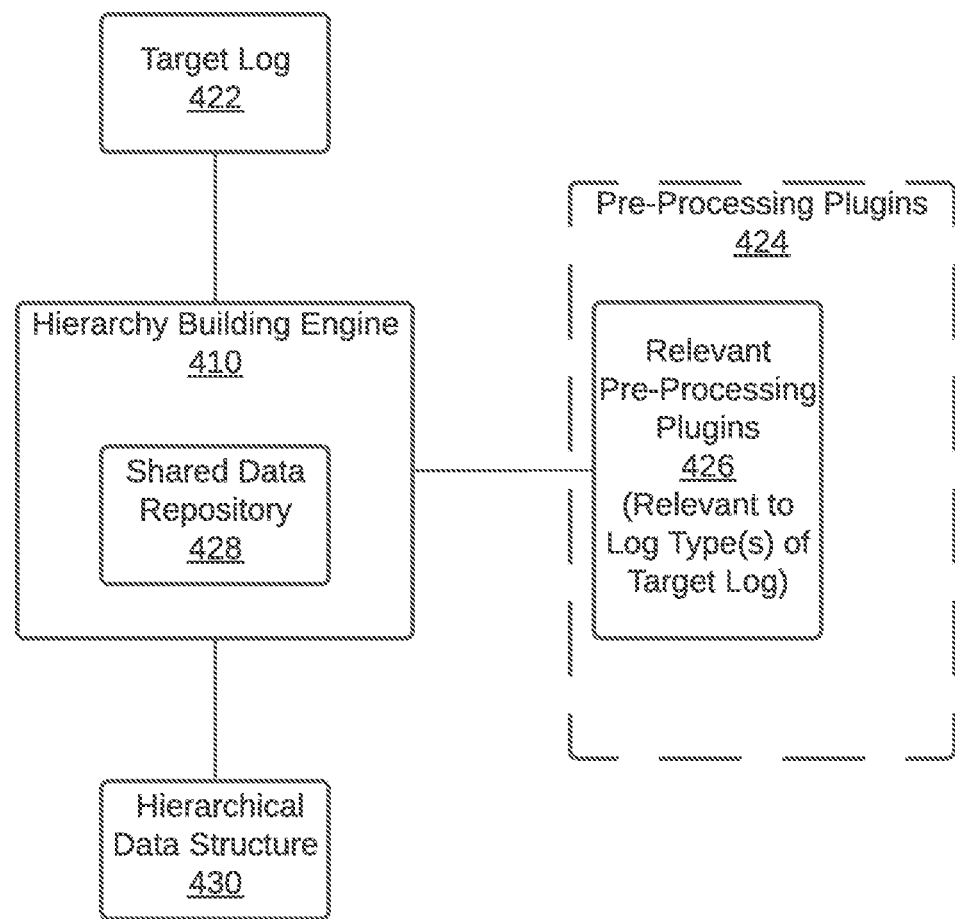
FIG. 4 illustrates a hierarchy building engine in accordance with one or more embodiments.

FIG. 4 illustrates a hierarchy building engine in accordance with one or more embodiments. A target log 422 (which may be a relevant log identified by a selector engine 206 of FIG. 2) is transmitted to a hierarchy building engine 410. The target log 422 is of a particular log type (which may be identified by a log type engine 308 of FIG. 3).

Pre-processing plugins 424 are stored in a data repository and accessible to the hierarchy building engine 410. The pre-processing plugins 424 are configured to generate a version of a hierarchical data structure. The hierarchical data structure includes a set of hierarchical nodes of different node types.

Different pre-processing plugins 424 may be configured to generate hierarchical nodes of different node types. A pre-processing plugin 424 is configured to determine whether any information from a log matches a set of information attributes relevant to the associated node type. Examples of information attributes include a text string, a text pattern, and/or an error code. A set of information of a log that matches information attributes of a pre-processing plugin 424 may be referred to as "recognized information."

Based on a set of recognized information from a log, a pre-processing plugin 424 is configured to create a new hierarchical node of the associated node type, generate data for the new hierarchical node, and/or generate metadata for the new hierarchical node. A pre-processing plugin 424 is configured to create the new hierarchical node either as a sibling node or as a child node. The pre-processing plugin 424 is also configured to determine the set of recognized information as data of the new hierarchical node. The pre-processing plugin 424 is also configured to determine values for a set of one or more keys as metadata of the new hierarchical node. The pre-processing plugin 424 may determine the values for the keys based on information of the new hierarchical node (including the set of recognized information) and/or information stored in the shared data repository 428. Different pre-processing plugins 424 are associated with different sets of keys. Examples of keys include a component name of a component associated with the recognized information, an error code associated with the recognized information, a performance metric or other metric associated with the recognized information.

Additionally or alternatively, the pre-processing plugins 424 are configured to determine values for a set of keys to be shared with other plugins via a shared data repository 428. The shared data repository 428 is accessible to multiple plugins, which may include pre-processing plugins 424 as well as other types of plugins. Shared keys stored into the shared data repository 428 conform to a shared naming convention common to the plugins having access to the shared data repository 428. Based on the shared naming convention, the same key is referenced using the same key name across different plugins.

Different pre-processing plugins 424 are associated with different log types. A pre-processing plugin 424 is configured to execute on logs of the associated log type. The pre-processing plugin 424 might not successfully or accurately execute on logs that are not of the associated log type.

Further, different pre-processing plugins 424 may be created and/or updated by different entities (such as field experts, departments, organizations, applications, machine learning algorithms). A first entity writes content of a first plugin without necessarily having knowledge of contents of a second plugin, while a second entity writes the content of the second plugin without necessarily having knowledge of the contents of the first plugin. Any dependencies of the first plugin on the second plugin, or vice versa, are not necessarily specified by either plugin. However, the various entities writing the pre-processing plugins 424 utilize a shared naming convention for keys. Based on the shared naming convention, plugins written independently by different entities refer to the same key by the same key name. Shared keys may be stored into the shared data repository 428 for access by different pre-processing plugins 424.

A hierarchy building engine 410 is configured to select a subset of pre-processing plugins 424 that are associated with the log type of a target log 422. The selected pre-processing plugins may be referred to as relevant pre-processing plugins 426. The hierarchy building engine 410 executes each relevant pre-processing plugin 426 on the target log 422. In an embodiment, a sequence of executions of the relevant pre-processing plugin 426 is determined without regard to dependencies amongst the plurality of plugins. The hierarchy building engine 410 hence generates hierarchical nodes that form a hierarchical data structure 430 and stores values for shared keys into a shared data repository 428.

Figure 5:
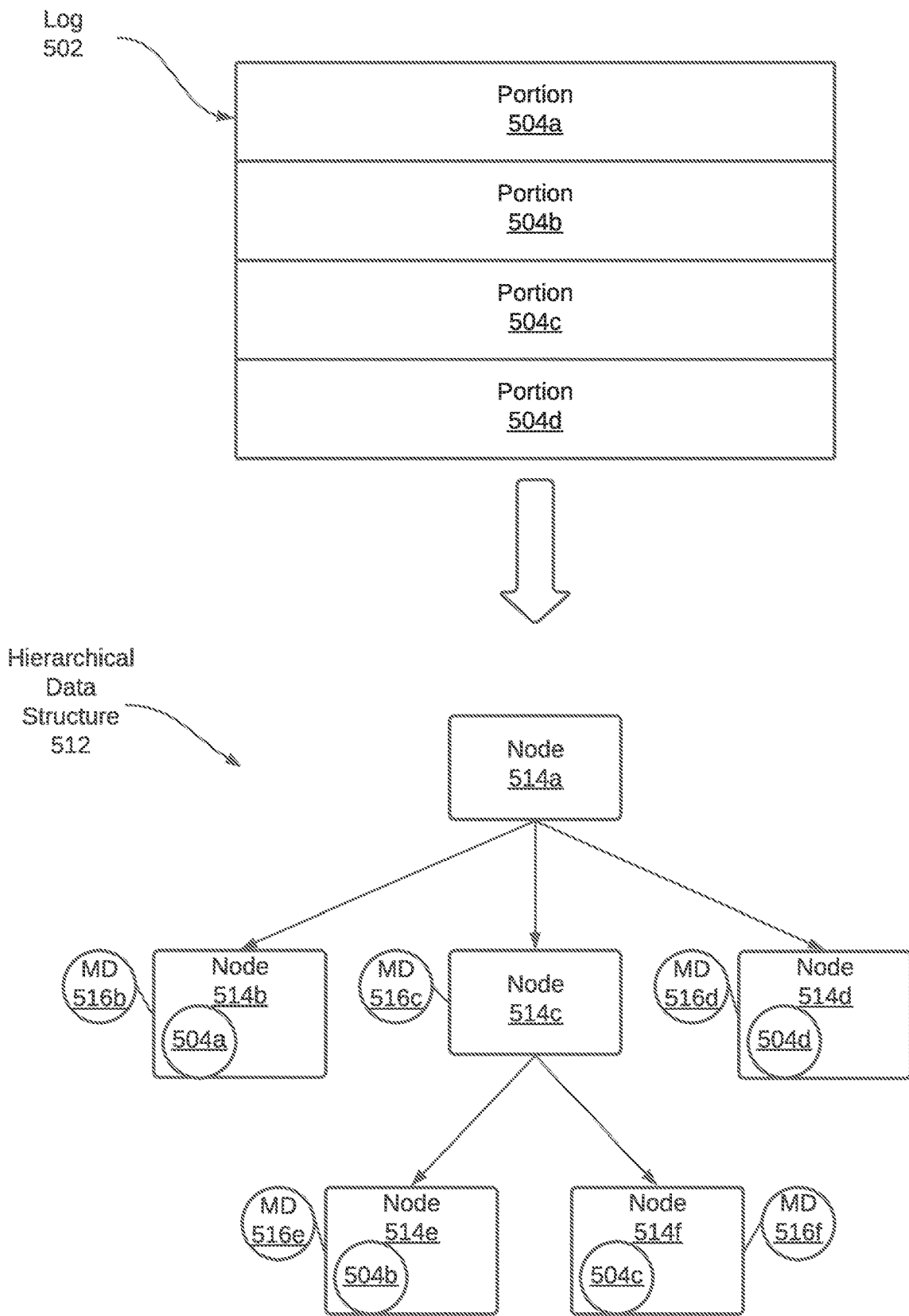
FIG. 5 illustrates an example hierarchical data structure representing a log in accordance with one or more embodiments.

FIG. 5 illustrates an example hierarchical data structure representing a log in accordance with one or more embodiments.

In an example, log 502 is similar to target log 422 of FIG. 4. Log 502 includes monitoring data, which initially is not necessarily divided into any identifiable portions 504a-504d. A hierarchy building engine processes log 502 by executing pre-processing plugins, which thereby identifies each of portion 504a-504d, and generates hierarchical data structure 512 representing log 502.

Hierarchical data structure 512 includes a set of nodes 514a-514f. As illustrated, node 514a is a root hierarchical node. Nodes 514b-514d are children of node 514a and are siblings with each other. Nodes 514e, 514f are children of node 514c and siblings with each other.

Nodes 514a, 514c are anchor nodes. Any data of nodes 514a, 514c is not directly associated with any portion of log 502. Nodes 514b, 514d, 514e, 514f, are data nodes. Data of node 514b includes portion 504a; data of node 514d includes portion 504d; data of node 514e includes portion 504b; data of node 514f includes portion 504c. In an embodiment, a parent node is an anchor node, while a leaf node is a data node.

Both anchor nodes and data nodes may be annotated with metadata. Node 514b is annotated with metadata 516b; node 514c is annotated with metadata 516c; node 514d is annotated with metadata 516d; node 514e is annotated with metadata 516e; node 514f is annotated with metadata 516f. Metadata of a particular node is determined based on data of the particular node, metadata of any ancestor nodes, and/or information stored in a shared repository.

A node may be represented using various types of data structures. Data of a node may be represented using various types of data structures. An annotation of a node may be represented using various types of data structures. In an embodiment, a node is an object stored in a heap or other runtime memory. Data of a node may be stored into a field of the object. Annotations of a node may be stored into another field of the object. In another embodiment, each of a node, data of the node, and annotations of the node is stored as a separate object. An object representing the node may include references to the object representing the data of the node and each object representing respective annotations of the node. In another embodiment, nodes are stored in table form. Each row of a table represents a node. One column of the table stores data of each node. Another column stores an annotation of each node. In other embodiments, linked lists, database records, and/or other data structures may be used.

In an embodiment, a hierarchical node inherits attributes and/or characteristics of an ancestor node. Conversely, attributes and/or characteristics of a hierarchical node is imputed to a descendant node. As an example, metadata of an ancestor node may include a component key. A value determined for the component key may be an identifier of a particular component of a computer network that is associated with the data of the ancestor node (for example, the particular component generated an error code included within the data of the ancestor node). The particular component is therefore an attribute and/or characteristic indicated by the metadata of the ancestor node. Meanwhile, metadata of a descendant node does not indicate any association with the particular component. However, based on the metadata of the ancestor node, the descendant node has an inherited association with the particular component.

Figure 6:
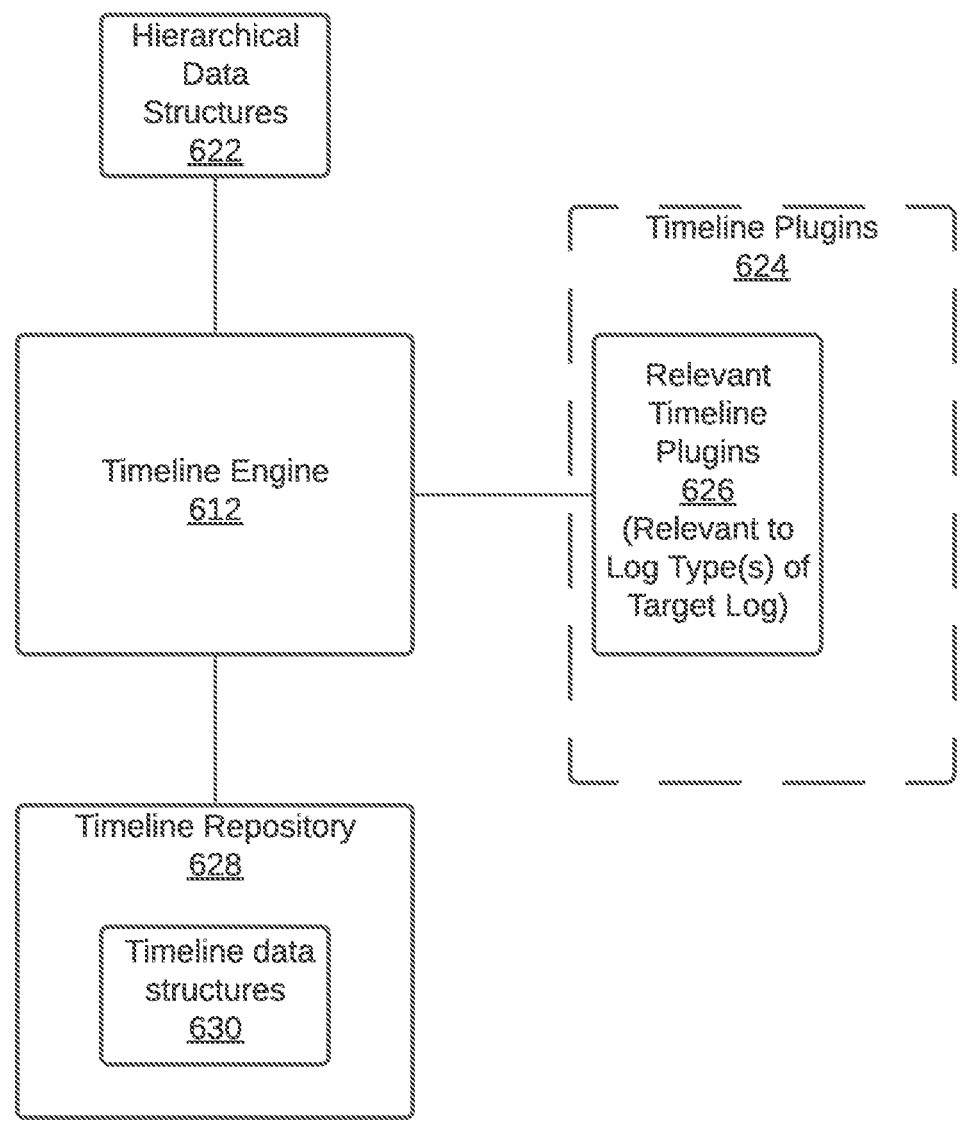
FIG. 6 illustrates a timeline engine in accordance with one or more embodiments.

FIG. 6 illustrates a timeline engine in accordance with one or more embodiments. One or more hierarchical data structures 622 (which may be generated by a hierarchy building engine 410 of FIG. 4) representing respective logs are transmitted to a timeline engine 612.

Timeline plugins 624 are stored in a data repository and accessible to the timeline engine 612. The timeline plugins 624 are configured to generate timeline data structures 630. The timeline data structure 630 include references to hierarchical nodes of the hierarchical data structures 622.

Different timeline plugins 624 are configured to generate timeline data structures 630 of different event types. A timeline plugin 624 is configured to determine whether any data of a hierarchical node (which includes a portion extracted from a log) matches a set of event attributes relevant to the associated event type. Examples of event attributes include a text string, a text pattern, and/or an error code. If a match is found, the timeline plugin 624 is configured to generate a timeline data structure 630 that references both the hierarchical node and the event type.

Timeline plugins 624 may be written by one or more experts independent of each other. Additionally or alternatively, timeline plugins 624 may be written and/or updated via machine learning.

Different timeline plugins 624 are associated with different log types. A timeline plugin 624 is configured to execute on hierarchical data structures 622 representing logs of the associated log type. The timeline plugin 624 might not successfully or accurately execute on hierarchical data structures representing logs that are not of the associated log type.

A timeline engine 612 is configured to traverse through each of hierarchical data structures 622. The timeline engine 612 is configured to identify a log type of a log represented by a hierarchical data structure 622 being processed. The timeline engine 612 is configured to select a subset of timeline plugins 624 that are associated with the identified log type. The selected timeline plugins may be referred to as relevant timeline plugins 626. The timeline engine 612 executes each relevant timeline plugin 626 with respect to each hierarchical node of the hierarchical data structure 622 being processed. The timeline engine 612 hence generates timeline data structures 630 for the hierarchical data structure 622. The timeline engine 612 then iterates the process of generating timeline data structures 630 for the next hierarchical data structure 622, and thereby traverses through each hierarchical data structure 622. Timeline data structures 630 referencing hierarchical nodes of different hierarchical data structures 622 may be stored in a same timeline data repository 628, or may be stored into separate timeline data repositories 628. The timeline data repository may be a part of, or may be separate from, the processed data repository 120 of FIG. 1.

Figure 7:
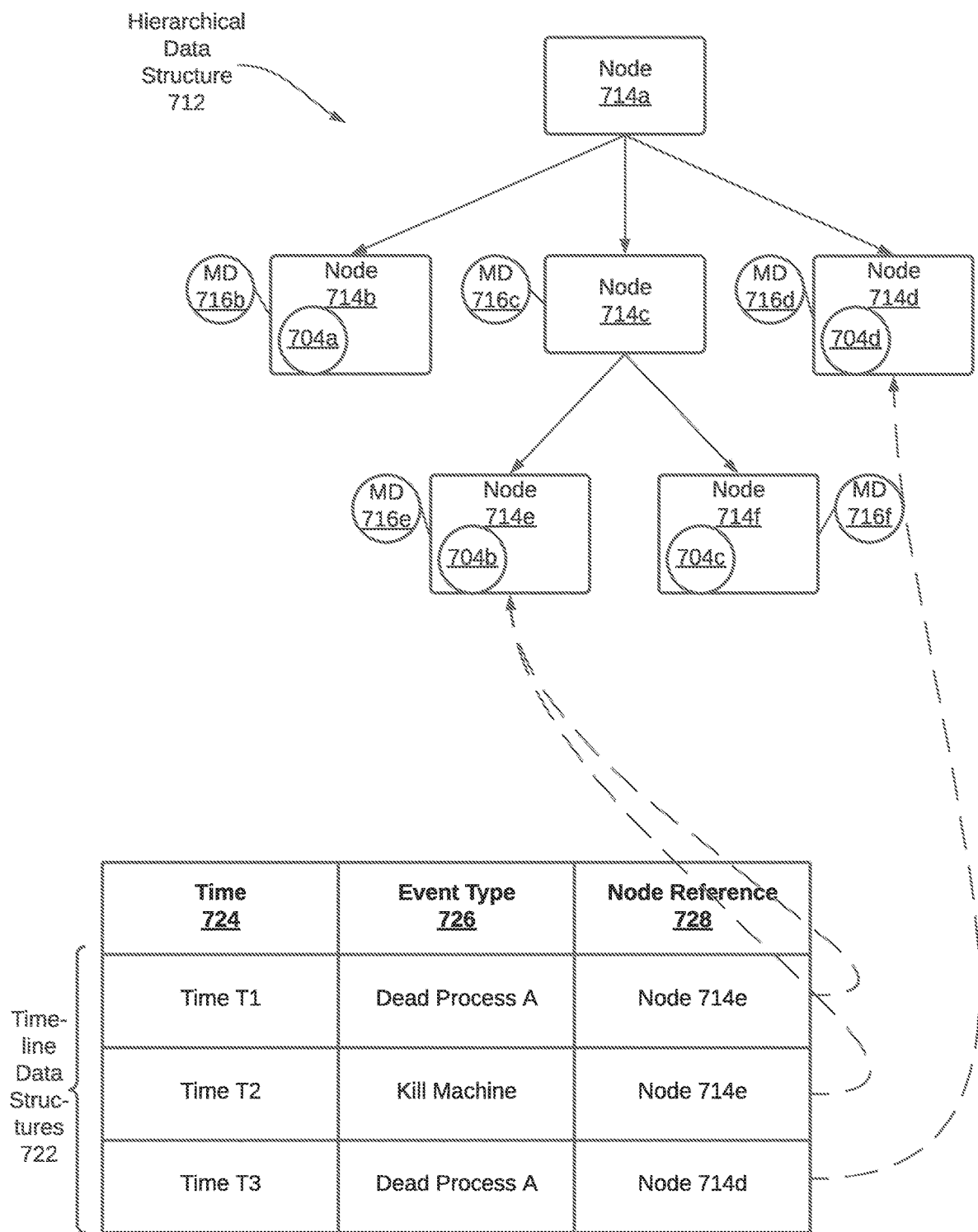
FIG. 7 illustrates example timeline data structures referencing a hierarchical data structure representing a log in accordance with one or more embodiments.

FIG. 7 illustrates example timeline data structures referencing a hierarchical data structure representing a log in accordance with one or more embodiments.

In an example, hierarchical data structure 712 is similar to hierarchical data structure 512 of FIG. 5. A timeline engine processes hierarchical data structure 712 by executing timeline plugins, which thereby generates timeline data structures 722 representing respective events detected within hierarchical data structure 712.

A timeline data structure 722 includes various fields or keys. As illustrated, examples of fields include time 724, event type 726, and node reference 728. Additional and/or alternative fields may be used.

An event type 726 of a timeline data structure 722 refers to the event type of the detected event represented by the timeline data structure 722. Examples of event types 726 include dead process, machine killed, memory overload, CPU overload, network connection problem. A timeline data structure 722 references an event type 726 by indicating an event type identifier, and/or including a reference to the event type 726.

A node reference 728 of a timeline data structure 722 refers to a reference to a hierarchical node of hierarchical data structure 712. As illustrated, a first timeline data structure includes a reference to node 714e; a second timeline data structure also includes a reference to node 714e; a third timeline data structure includes a reference to node 714d. Multiple timeline data structures 722 may reference a same hierarchical node. A node reference 728 may be represented using various data structures, such as a pointer to a hierarchical node, and/or a hierarchical node identifier.

A timeline data structure 722 referencing a hierarchical node indicates that the timeline data structure 722 is associated with information (data, metadata, and/or analysis data) of the referenced hierarchical node. The timeline data structure 722 need not directly store any data, metadata, and/or analysis data of the referenced hierarchical node. For example, if metadata of a hierarchical node indicates an association with a particular component of a computer network, then a timeline data structure referencing the hierarchical node also has an association with the particular component, even if the timeline data structure itself does not directly store an association with the particular component.

In an embodiment, a hierarchical node inherits attributes and/or characteristics of an ancestor node, as described above with reference to FIG. 5. Therefore, a timeline data structure 722 referencing a hierarchical node also indicates that the timeline data structure 722 is associated with the information of any ancestor nodes of the referenced hierarchical node. The timeline data structure 722 need not directly store any data, metadata, and/or analysis data of ancestor nodes of the referenced hierarchical node. For example, if metadata of a hierarchical node indicates an association with a particular component of a computer network, then a timeline data structure referencing a descendant node to the hierarchical node also has an association with the particular component.

A time 724 of a timeline data structure 722 refers to a particular time or time period associated with the detected event. As illustrated, a first timeline data structure is associated with time T1; a second timeline data structure is associated with time T2; a third timeline data structure is associated with time T3. The time 724 of a timeline data structure 722 is determined based on a time of the hierarchical node referenced by the timeline data structure 722.

A time 724 of a timeline data structure 722 is the time of a hierarchical node referenced by the timeline data structure. A time of a hierarchical node is determined using timestamps within the log represented by the hierarchical data structure (including timestamps within the log portion included as data of the hierarchical node itself, if any), and/or line numbers of the data of the hierarchical node. Examples of operations for determining a time of a timeline data structure are described below with reference to Operation 1614 of FIG. 16.

A timeline data structure 722 may be represented using various types of data structures. In an embodiment, a timeline data structure 722 is an object stored in a heap or other runtime memory. Time 724, event type 726, and node reference 728 of a timeline data structure each may be stored as a separate field of the object. In another embodiment, timeline data structures 722 are stored in table form. Each row of a table represents a timeline data structure 722. One column of the table stores time 724. Another column stores event type 726. Another column stores node reference 728. In other embodiments, linked lists, database records, and/or other data structures may be used.

Figure 8:
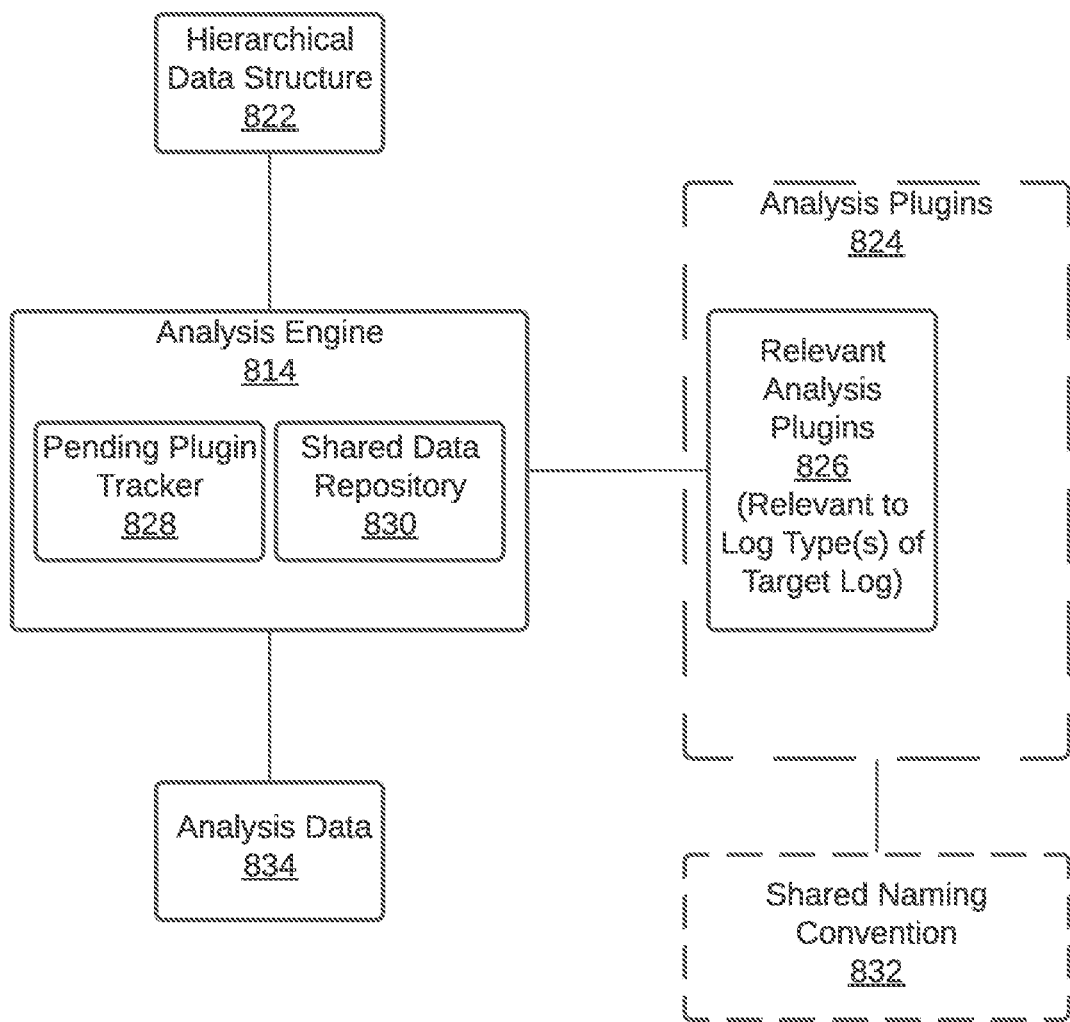
FIG. 8 illustrates an analysis engine in accordance with one or more embodiments.

FIG. 8 illustrates an analysis engine in accordance with one or more embodiments. A hierarchical data structure 822 (which may be generated by a hierarchy building engine 410 of FIG. 4) representing a log is transmitted to an analysis engine 814.

Analysis plugins 824 are stored in a data repository and accessible to the analysis engine 814. Analysis plugins 824 are configured to update and/or add to the hierarchical data structure 822 to generate a new version of a hierarchical data structure. The new version of the hierarchical data structure includes analysis data 834 for the hierarchical nodes.

An analysis plugin 824 is configured to determine values for a set of keys as analysis data 834 of a hierarchical node. Additionally or alternatively, an analysis plugin 824 is configured to determine a values for a set of keys to be stored into a shared data repository 830. The analysis plugin 824 may determine the values for the keys based on information of a hierarchical node (which includes a portion extracted from a log), information of any ancestor nodes of the hierarchical node, and/or information stored in the shared data repository 830. Different analysis plugins 824 may be associated with different sets of keys. Examples of keys include a CPU actual usage or percentage usage, a memory actual usage or percentage usage, a total CPU available, a total memory available, a component associated with the hierarchical node, an error code and/or error type associated with the hierarchical node. The keys included as analysis data 834 for a hierarchical node, the keys included as metadata for the hierarchical node, and/or the keys stored into the shared data repository 830 may be same or different.

A shared data repository 830 is accessible to multiple plugins, which may include analysis plugins 824 as well as other types of plugins. Multiple plugins have write access and/or read access to the shared data repository 830. Keys stored in the shared data repository 830 conform to a shared naming convention 832 common to the plugins having access to the shared data repository 830. Based on the shared naming convention 832, the same key is referenced using the same key name across different plugins.

Different analysis plugins 824 are associated with different log types. An analysis plugins 824 is configured to execute on hierarchical data structures 822 representing logs of the associated log type. The analysis plugins 824 might not successfully or accurately execute on hierarchical data structures representing logs that are not of the associated log type.

Further, different analysis plugins 824 may be created and/or updated by different entities (such as experts, departments, organizations, applications, machine learning algorithms). A first entity writes content of a first plugin without necessarily having knowledge of contents of a second plugin, while a second entity writes the content of the second plugin without necessarily having knowledge of the contents of the first plugin. Any dependencies of the first plugin on the second plugin, or vice versa, are not necessarily specified by either plugin. However, the various entities writing the analysis plugins 824 utilize a shared naming convention 832 for keys. Based on the shared naming convention 832, plugins written independently by different entities refer to the same key by the same key name. Shared keys may be stored into the shared data repository 830 for access by different analysis plugins 824.

An analysis engine 814 is configured to identify a log type of a log represented by a hierarchical data structure 822 being processed. The analysis engine 814 is configured to select a subset of analysis plugins 824 that are associated with the identified log type. The selected timeline plugins may be referred to as relevant analysis plugins 826. The analysis engine 814 executes each relevant analysis plugins 826 with respect to each hierarchical node of the hierarchical data structure 622. The analysis engine 814 hence determines values for keys for storage as analysis data 834 and/or storage into shared data repository 830.

Executing an analysis plugin 826 with respect to a hierarchical node includes determining values for a set of keys based on information (data, metadata, and/or analysis data)

of the hierarchical node; information of any ancestor nodes to the hierarchical node; and/or information stored in the shared data repository 830. Hence, a first analysis plugin 826 may determine analysis data for a first hierarchical node based on analysis data determined by a second analysis plugin for a second hierarchical node that has an ancestor relationship with the first analysis plugin.

During execution of the analysis plugin 826 with respect to a hierarchical node, the analysis plugin 826 does not determine values for any keys based on information of non-ancestor nodes to the hierarchical node. The analysis plugin 826 might not access any information of non-ancestor nodes to the hierarchical node at all.

In an embodiment, the accessibility restrictions imposed on an analysis plugin 826 are dependent on the hierarchical node being processed. During execution of an analysis plugin 826 with respect to a first hierarchical node, accessibility restrictions may prevent the analysis plugin 826 from having access to non-ancestor nodes to the first hierarchical node. Subsequently, during execution of the analysis plugin 826 with respect to a second hierarchical node, accessibility restrictions may prevent the analysis plugin 826 from having access to non-ancestor nodes to the second hierarchical node. Hence, a hierarchical node that is not accessible to the analysis plugin 826 during execution with respect to the first hierarchical node may be accessible to the analysis plugin 826 during execution with respect to the second hierarchical node; conversely, a hierarchical node that is accessible to the analysis plugin 826 during execution with respect to the first hierarchical node might not be accessible to the analysis plugin 826 during execution with respect to the second hierarchical node.

As described above, the analysis engine 814 executes each relevant analysis plugins 826 with respect to each hierarchical node of the hierarchical data structure 622. In an embodiment, a sequence of executions of the plurality of analysis plugins 826 is determined without regard to dependencies amongst the analysis plugins 826. A first analysis plugin 826 depends upon a second analysis plugin 826 if the second analysis plugin 826 outputs a value that is used as input to the first analysis plugin 826; the first analysis plugin 826 is referred to as a "dependent plugin" and the second analysis plugin 826 is referred to as a "requisite plugin." If a dependent plugin is executed prior to a requisite plugin, then the dependent plugin will not be able to successfully complete. The dependent plugin will determine that a required value (the output value from the requisite plugin) is missing. A pending plugin tracker 838 is configured to track which analysis plugins 826 remain pending. The analysis engine 814 is configured to re-execute any pending analysis plugins 826 flagged by the pending plugin tracker 838.

Figure 9:
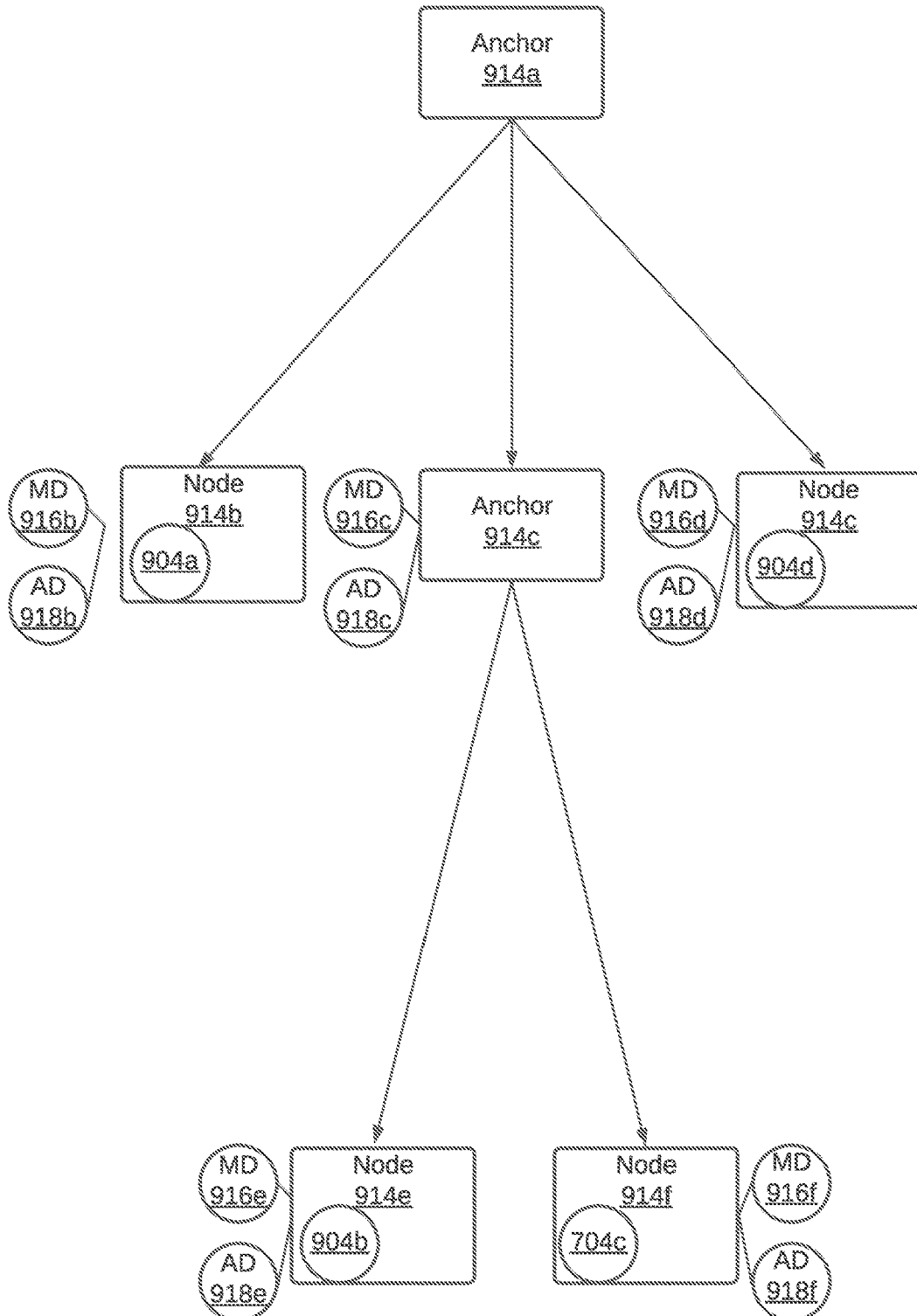
FIG. 9 illustrates an example hierarchical data structure annotated with metadata and analysis data in accordance with one or more embodiments.

FIG. 9 illustrates a hierarchical data structure annotated with metadata and analysis data in accordance with one or more embodiments.

In an example, an analysis engine processes a version of a hierarchical data structure that includes a set of hierarchical nodes, each annotated with metadata. The analysis engine generates a new version of the hierarchical data structure 912, wherein each hierarchical node is further annotated with analysis data. Hierarchical data structure 912 may be similar to hierarchical data structure 512 of FIG. 5, except that hierarchical data structure 912 further includes analysis data. Analysis data of a hierarchical node is determined based on information (data, metadata, and/or analysis data) of the hierarchical node; information of any ancestor nodes; and/or information stored in a shared repository. Hierarchical data structure 912 represents a log including portions 904a-904d.

Hierarchical data structure 912 includes a set of nodes 914a-914f. As illustrated, node 914a is a root hierarchical node. Nodes 914b-914d are children of node 914a and are siblings with each other. Nodes 914e, 914f are children of node 914c and siblings with each other. Data of node 914b includes portion 904a; data of node 914d includes portion 904d; data of node 914e includes portion 904b; data of node 914f includes portion 904c. Further, node 914b is annotated with metadata 916b and analysis data 918b; node 914c is annotated with metadata 916c and analysis data 918c; node 914d is annotated with metadata 916d and analysis data 918d; node 914e is annotated with metadata 916e and analysis data 918e; node 914f is annotated with metadata 916f and analysis data 918f.

As described above with reference to FIG. 5, an annotation of a node may be represented using various types of data structures, such as an object, a field, a table entry, a linked list, a database record. Analysis data 834 of a particular hierarchical node may be stored in the same annotation that stores metadata for the particular hierarchical node. Alternatively, analysis data 834 of the particular hierarchical node may be stored in a different annotation from the annotation that stores metadata for the particular hierarchical node.

Figure 10:
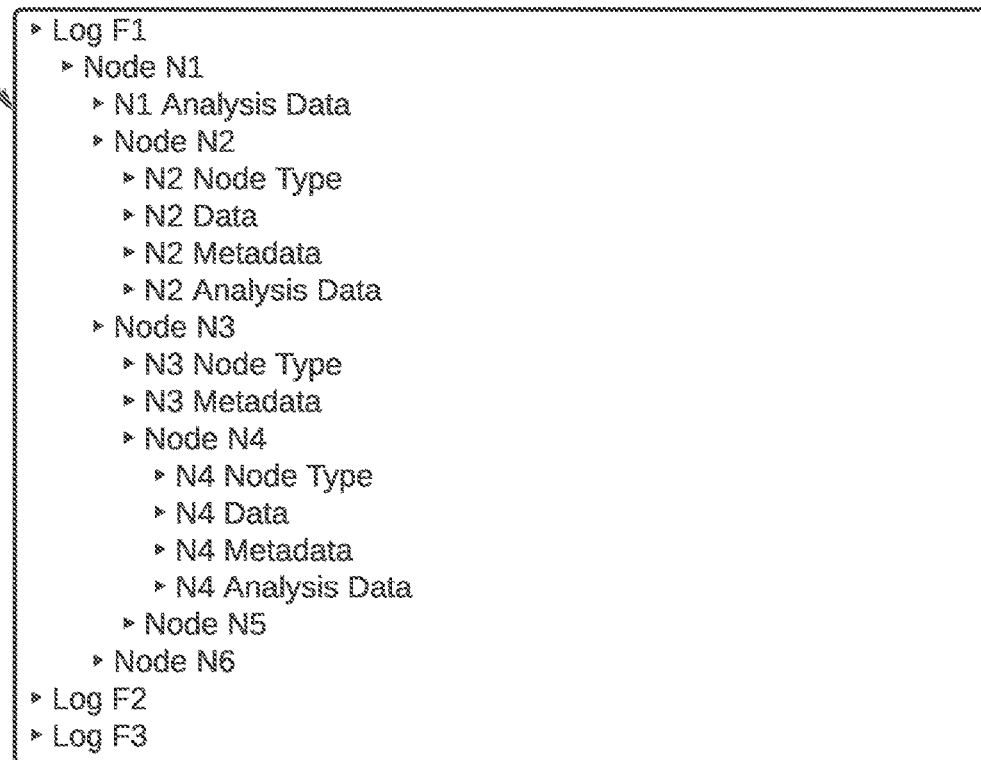
FIG. 10 illustrates an example representation of hierarchical data structures in accordance with one or more embodiments.

FIG. 10 illustrates an example representation of hierarchical data structures in accordance with one or more embodiments. In an example, a user interface is configured to present hierarchical data structures 1012 representing logs F1, F2, F3. Each hierarchical data structure is presented as a series of hierarchical levels. A first hierarchical level includes items representing respective logs, such as logs F1, F2, F3. A second hierarchical level includes items representing respective nodes. A hierarchical level below an item representing a node may include (a) items representing metadata and/or analysis data and/or (b) items representing child nodes. Each item is clickable to hide or show the respective details.

As illustrated, various items corresponding to log F1 have been clicked to show the respective details. Under log F1, a first hierarchical level includes an item representing node N1. Node N1 is a root hierarchical node. A second hierarchical level includes (a) metadata and/or analysis data of node N1 (such as "N1 Analysis Data"), and (b) child nodes of node N1, which include node N2 and node N3 and node N6. A hierarchical level below node N2 includes (a) data of node N2 and (b) metadata and/or analysis of node N2 (such as "N2 Node Type," "N2 Metadata," "N2 Analysis Data"). Node N2 does not have any child nodes. A hierarchical level below node N3 includes (a) metadata and/or analysis of node N3 (such as "N3 Node Type," "N3 Metadata"), and (b) child nodes of node N3, which include node N4 and node N5. A hierarchical level below node N4 includes (a) data of node N4, and (b) metadata and/or analysis data of node N4 (such as "N4 Node Type," "N4 Metadata," "N4 Analysis Data"). The items representing node N5 and node N6 have been clicked to hide the respective details.

Figure 11:
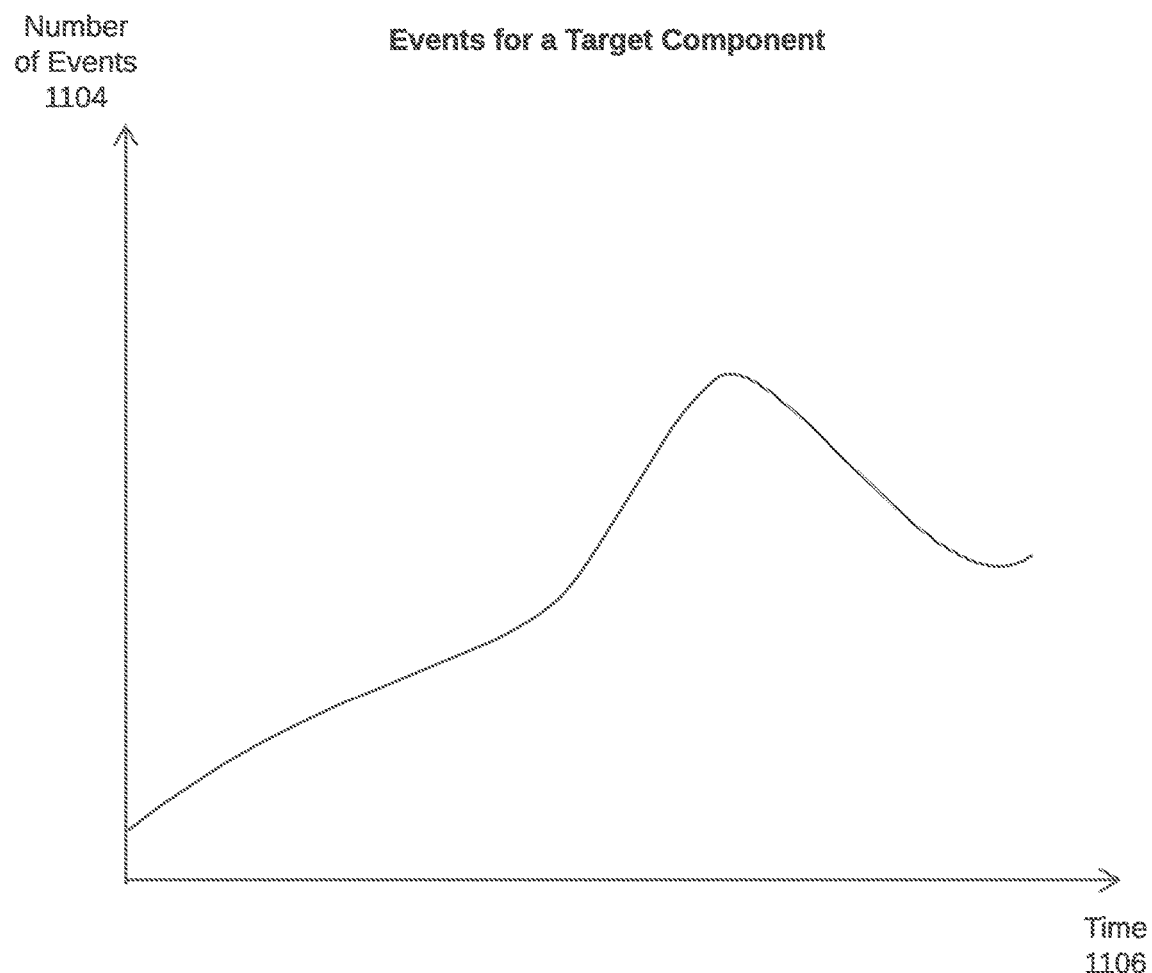
FIG. 11 illustrates a timeline report relevant to a target component of a computing system in accordance with one or more embodiments.

FIG. 11 illustrates a timeline report 1102 relevant to a target component of a computing system in accordance with one or more embodiments. In an example, a timeline report 1102 includes a line graph. An x-axis represents time 1106. A y-axis represents number of events 1104. A line on the line graph represents a number of events at each point in time for a target component. Each timeline data structure that is directly or indirectly associated with the target component is counted as an event. A timeline data structure is directly associated with the target component results if the metadata and/or analysis data of the hierarchical node referenced by the timeline data structure includes a component key whose value is an identifier or reference to the target component. A timeline data structure is indirectly associated with the target component results if the metadata and/or analysis data of an ancestor node to the hierarchical node referenced by the timeline data structure includes a component key whose value is an identifier or reference to the target component.

FIGS. 12A-12B illustrate example representations of analysis data on a user interface in accordance with one or more embodiments. Referring to FIG. 12A, in an example, a user interface 1202 is configured to present node data 1204 and node analysis data 1206 of a particular hierarchical node in a hierarchical data structure representing a particular log. Node data 1204 includes a log portion extracted from the particular log. Node analysis data 1206 indicates values for a set of keys determined based on data 1204, metadata, and/or analysis data of the particular hierarchical node; metadata and/or analysis data of any ancestor nodes; and/or information stored in a shared data repository. The user interface may present the keys in various categories. As illustrated, the categories include "Analysis," "Incident," and "Map." Under the "Analysis" category, example keys include "Bus Error," "Physical Page," and "System Memory Issue." "Bus Error" indicates an error type. "Physical Page" indicates possible causes for the error. "System Memory Issue" indicates particular issues with the memory. Here, both memory and swap are over 95% occupied. Under the "Incident" category, example keys include "Address," "Error," "Error Arguments," and "Error String." "Address" indicates the memory address at issue. "Error" indicates an error code. "Error Arguments" indicates various attributes relevant to the error. "Error String" indicates a description of the error found within the particular log. Under the "Map" category, example keys include "Info" and "Range." "Info" includes information relevant to the memory address at issue. "Range" includes information relevant to memory addresses within a particular range of the memory address at issue.

Referring to FIG. 12B, in an example, a user interface 1212 is configured to present node data 1214 and node analysis data 1216 of a particular hierarchical node in a hierarchical data structure representing a particular log. Node data 1214 includes a log portion extracted from the particular log. Node analysis data 1216 indicates values for a set of keys determined based on data 1214, metadata, and/or analysis data of the particular hierarchical node; metadata and/or analysis data of any ancestor nodes; and/or information stored in a shared data repository. The user interface may present the keys in various categories. As illustrated, the categories include "Arguments," "Callee," "Caller," "Caller-Source," "Caller-Source2," and "Local." "Arguments" keys indicate what arguments were input into a callee method. A "Callee" key indicates an identifier of the callee method. A "Caller" key indicates an identifier of the caller method. A "Caller Source" key indicates an identifier of a source of the caller method. The source of the caller method may be a class file. A "Caller Source 2" key indicates a target line of code that includes a call from the caller method to the callee method, and a range of lines of code before and after the target line of code. "Local" keys indicates values for local keys at the time of the call from the caller method to the callee method.

3. Generating a Hierarchical Data Structure

One or more operations illustrated in FIGS. 13-15B may be modified, rearranged, or omitted all together. Accordingly, the particular sequence of operations illustrated in FIGS. 13-15B should not be construed as limiting the scope of one or more embodiments.

Figure 13:
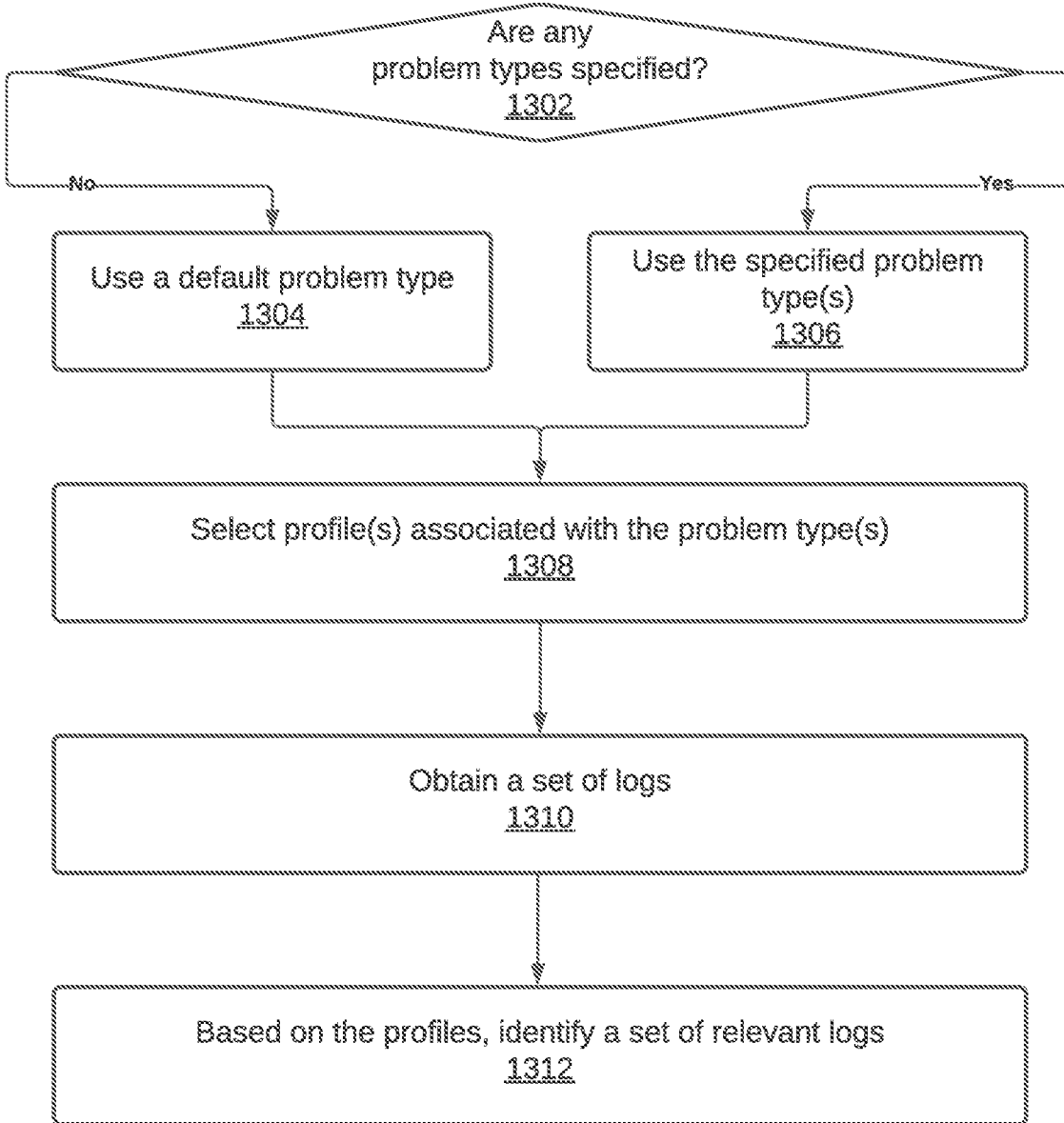
FIG. 13 illustrates an example set of operations for identifying a relevant set of logs for analysis in accordance with one or more embodiments.

FIG. 13 illustrates an example set of operations for identifying a relevant set of logs for analysis in accordance with one or more embodiments.

One or more embodiments include determining whether any problem types are specified (Operation 1302). A selector engine determines whether any problem types of interest are specified. The problem types of interest may be specified manually and/or by an application.

If no problem types are specified, one or more embodiments include using a default problem type (Operation 1304). If one or more problem types are specified, one or more embodiments include using the specified problem types (Operation 1306).

One or more embodiments include selecting one or more profiles associated with the problem types (Operation 1308). The selector engine identifies a pool of profiles from a data repository. The selector engine selects a subset of profiles, from the pool of profiles, that are associated with the problem types of interest.

One or more embodiments include obtaining a set of logs (Operation 1310). The selector engine obtains a set of logs from a set of components of a computer network. The set of logs may be logs produced in a most recent time period. Additionally or alternatively, the set of logs may be logs satisfying certain criteria. The number of logs obtained may be very large. The logs may also be expressed in various different formats.

One or more embodiments include identifying a set of relevant logs based on the selected profiles (Operation 1312). The selector engine compares each log to each selected profile. If a log includes attributes specified by a profile, then the selector engine classifies the log as relevant. Otherwise, the selector engine classifies the log as not relevant.

Figure 14:
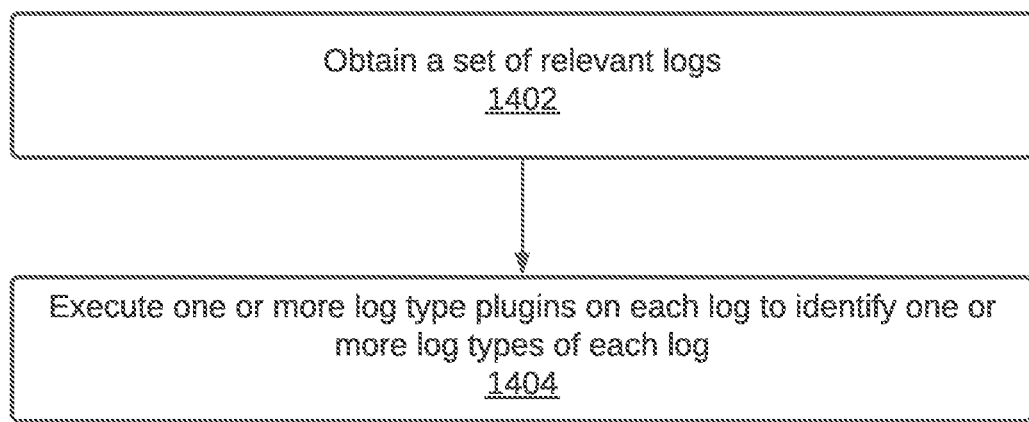
FIG. 14 illustrates an example set of operations for identifying one or more log types of each log.

FIG. 14 illustrates an example set of operations for identifying one or more log types of each log in accordance with one or more embodiments.

One or more embodiments include obtaining a set of relevant logs (Operation 1402). A log type engine obtains a set of relevant logs. The relevant logs may be the logs identified at Operation 1312 of FIG. 13.

One or more embodiments include executing one or more log type plugins on each log to identify one or more log types of each log (Operation 1404). The log type engine identifies a pool of log type plugins, each associated with a respective log type. The log type engine executes each log type plugin with respect to each log. If a log includes attributes specified by a log type plugin, then the log type engine classifies the log as being of the log type associated with the log type plugin. If a log includes attributes specified by multiple log type plugins, then the log may be of multiple log types.

Figure 15A:
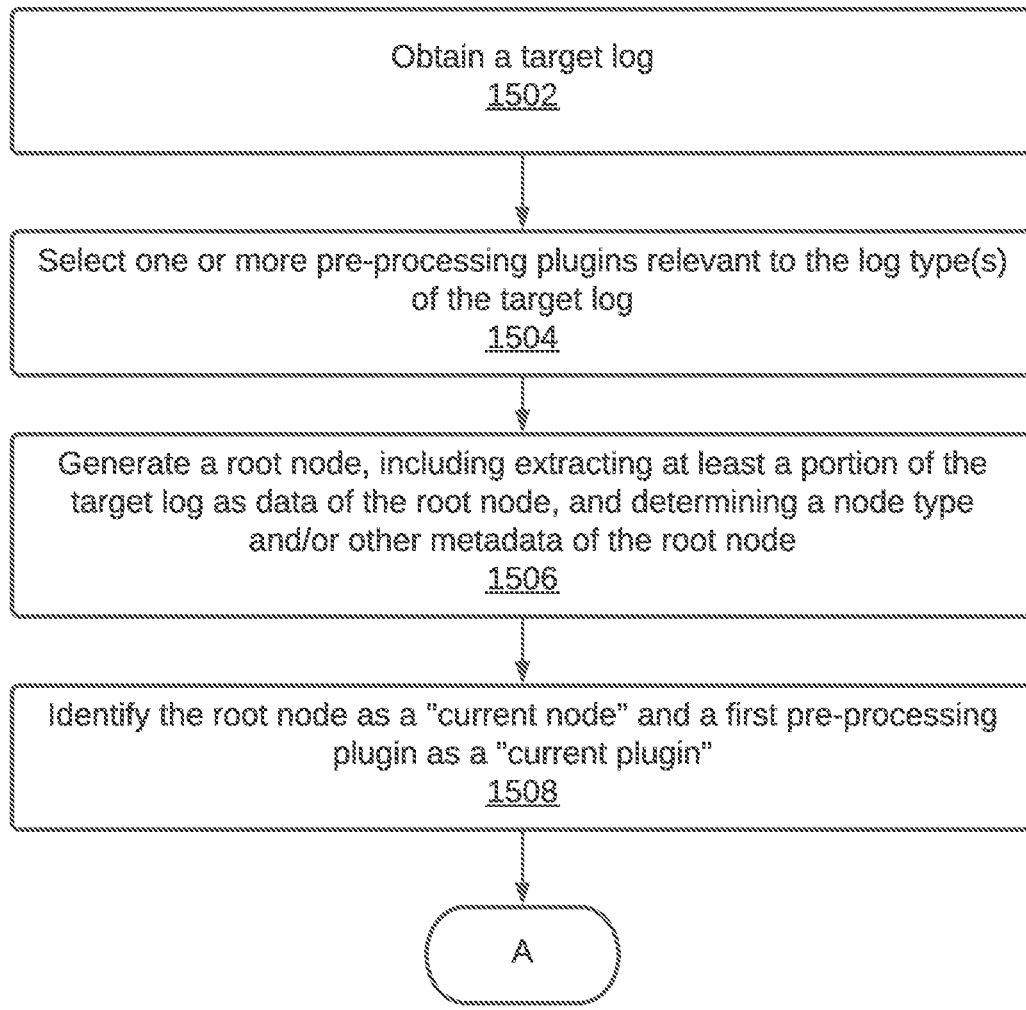
FIGS. 15A-15B illustrate an example set of operations for generating a hierarchical data structure including metadata in accordance with one or more embodiments.
Figure 15B:
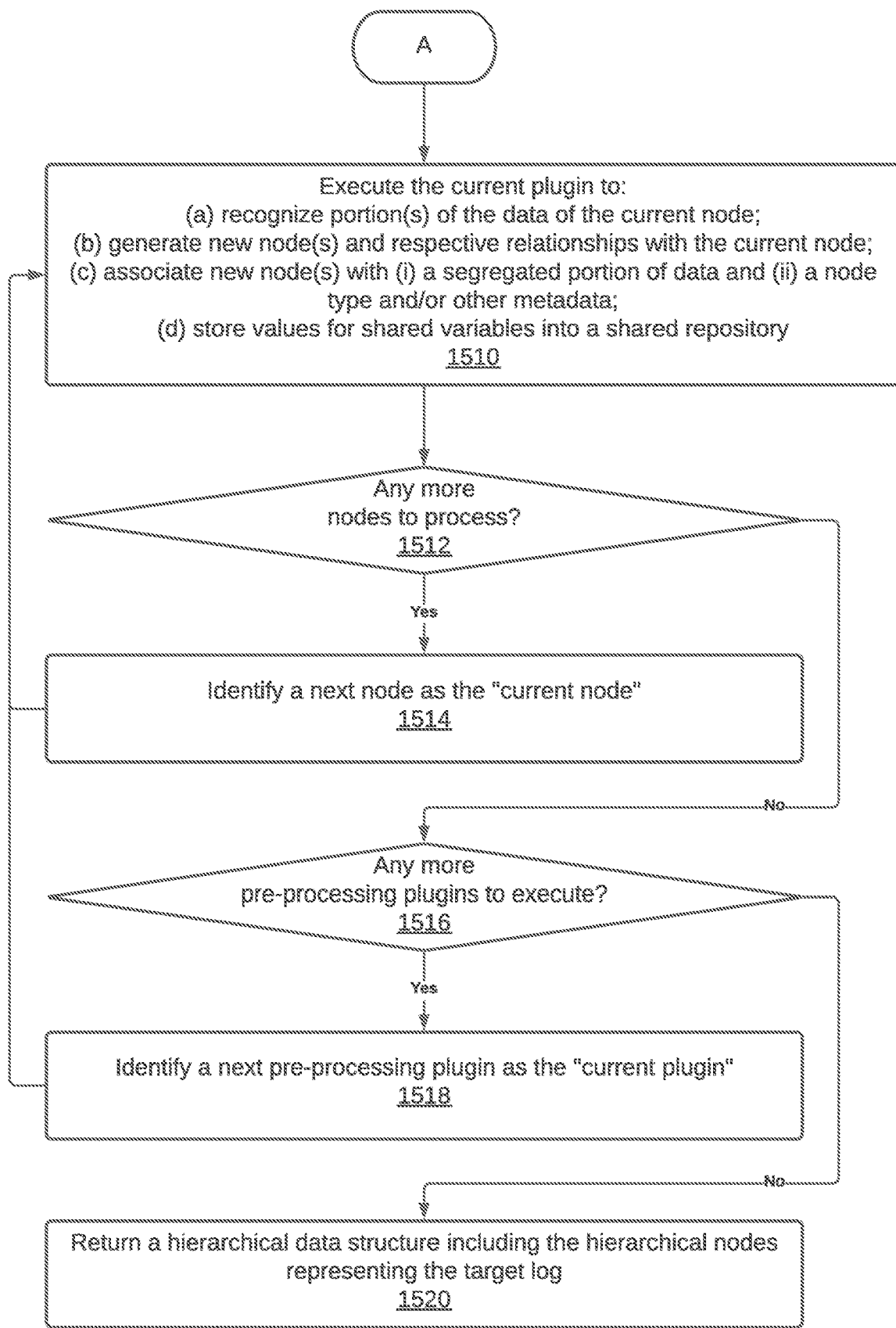

FIGS. 15A-15B illustrate an example set of operations for generating a hierarchical data structure including metadata in accordance with one or more embodiments.

One or more embodiments include obtaining a target log (Operation 1502). A hierarchy building engine obtains a target log. The target log may be a relevant log identified at Operation 1312 of FIG. 13.

One or more embodiments include selecting one or more pre-processing plugins relevant to the one or more log types of the target log (Operation 1504). The hierarchy building engine identifies one or more log types of the target log. The log types of the target log may be identified at Operation 1402 of FIG. 14.

The hierarchy building engine identifies a pool of pre-processing plugins, each associated with a respective log type. The hierarchy building engine selects a subset of pre-processing plugins, from the pool of pre-processing plugins, that are associated with the log types of the target log. The selected pre-processing plugins may be referred to as the "relevant pre-processing plugins."

One or more embodiments include generating a root hierarchical node, including extracting at least a portion of the target log as data of the root node, and determining a node type and/or other metadata of the root hierarchical node (Operation 1506). The hierarchy building engine generates a root hierarchical node of a hierarchical data structure. The hierarchy building engine extracts at least a portion of the target log, and stores the extracted log portion as data of the root hierarchical node. The hierarchy building engine may also determine a node type and/or other metadata of the root hierarchical node based on the extracted log portion. The hierarchy building engine may perform the above steps by executing a pre-processing plugin. Additionally or alternatively, the hierarchy building engine may perform the above steps by executing code built into the hierarchy building engine that is configured to generate root hierarchical nodes.

One or more embodiments include identifying the root hierarchical node as a "current node" and a first pre-processing plugin as a "current plugin" (Operation 1508). The hierarchy building engine identifies the root hierarchical node as a "current node" and a first pre-processing plugin as a "current plugin," thereby starting an iterative process.

One or more embodiments include executing the current plugin to: (a) recognize sub-portion(s) of the data of the current node; (b) generate new hierarchical node(s) and respective relationships with the current node; (c) associate new hierarchical node(s) with (i) a respective sub-portion of the data of the current node and (ii) a node type and/or other metadata; and (d) store values for shared keys into a shared repository (Operation 1510). The hierarchy building engine executes the current plugin. The current plugin includes code and/or instructions to perform the operations (a)-(d) above.

Based on the current plugin, the hierarchy building engine recognizes sub-portion(s) of the data of the current node. In an embodiment, the hierarchy building engine compares the data of the current node with information attributes specified by the current plugin. If a match is found for a sub-portion of the data of the current node, then the hierarchy building engine determines the sub-portion as "recognized information." The hierarchy building engine may recognize one or more sub-portions of the data of the current node.

Based on the current plugin, the hierarchy building engine generates one or more new hierarchical nodes and respective relationships with the current node. In an embodiment, the hierarchy building engine generates a new hierarchical node for each set of recognized information. The hierarchy building engine also generates a new hierarchical node for any sets of non-recognized information remaining from the data of the current node. Each new hierarchical node is created as either a child node or a sibling node of the current node, depending on the specifications of the current plugin. Creating a hierarchical node involves creating a new data structure representing the hierarchical node. The new data structure may be, for example, a new object in heap, a new table entry, a new linked list, a new database record. Creating a relationship between two hierarchical nodes may involve storing a reference in each hierarchical node to each other, and storing a label indicating either a child relationship or sibling relationship. Additionally or alternatively, creating a relationship between two hierarchical nodes may involve adding an object, table entry, or other data structure that indicates the relationship type and references the two hierarchical nodes. Other methods of creating a hierarchical node and/or a relationship may be used.

Based on the current plugin, the hierarchy building engine associates each new hierarchical nodes with data and/or metadata. In an embodiment, the hierarchy building engine stores a set of recognized information as data of a new hierarchical node. The hierarchy building engine further determines values for a set of keys specified by the current plugin. One such key may be "node type." The values for the keys are determined based on (a) information of the new hierarchical node (including the set of recognized information), and/or (b) information stored in a shared repository. In an embodiment, the values for the keys are not determined based on information of other hierarchical nodes. The hierarchy building engine stores the values for the keys as metadata of the new hierarchical node.

Further, the hierarchy building engine stores a set of non-recognized information as data of a new hierarchical node. The hierarchy building engine might not determine any metadata for the new hierarchical node that includes non-recognized information. The current plugin does not necessarily include any instructions for determining metadata of hierarchical nodes including information that is not recognized by the current plugin.

Further, the hierarchy building engine disassociates the current node with any portion of the log. The current node thereby becomes an anchor node. The hierarchy building engine may optionally store information within metadata of the current node indicating that the current node is now an anchor node.

Based on the current plugin, the hierarchy building engine stores values for shared keys into the shared repository. In an embodiment, the hierarchy building engine further determines values for a set of shared keys specified by the current plugin. The values for the shared keys are determined based on (a) information of the new hierarchical node, (b) information of any ancestor nodes, and/or (c) information stored in the shared repository. The hierarchy building engine stores the values for the shared keys into the shared repository.

One or more embodiments include determining whether there are any more nodes to process (Operation 1512). The hierarchy building engine determines whether the hierarchical data structure currently includes any hierarchical nodes not yet traversed by the current plugin.

If there is another node to process, one or more embodiments include identifying a next node as the "current node" (Operation 1514). The hierarchy building engine identifies a next hierarchical node of the hierarchical data structure for processing. The next hierarchical node may be a child node or a sibling node to the current node. The next hierarchical node is now the "current node." The hierarchy building engine then reiterates Operations 1510-1514 with respect to the current node.

One or more embodiments include determining whether there are any more pre-processing plugins to execute (Operation 1516). The hierarchy building engine determines any of the set of relevant pre-processing plugins identified at Operation 1504 have not yet been executed.

If a relevant pre-processing plugin remains unprocessed, one or more embodiments include identifying a next pre-processing plugin as the "current plugin" (Operation 1518). The hierarchy building engine identifies a next relevant pre-processing plugin for execution. The next pre-processing plugin is now the "current plugin." The hierarchical building engine then reiterates Operations 1510-1518 using the current plugin.

If all hierarchical nodes are traversed by the current plugin, and there are no more pre-processing plugins to execute, one or more embodiments include returning a hierarchical data structure including the hierarchical nodes representing the target log (Operation 1520). The hierarchy building engine returns the hierarchical data structure including the hierarchical nodes representing the target log.

4. Generating a Timeline Data Structure

Figure 16A:
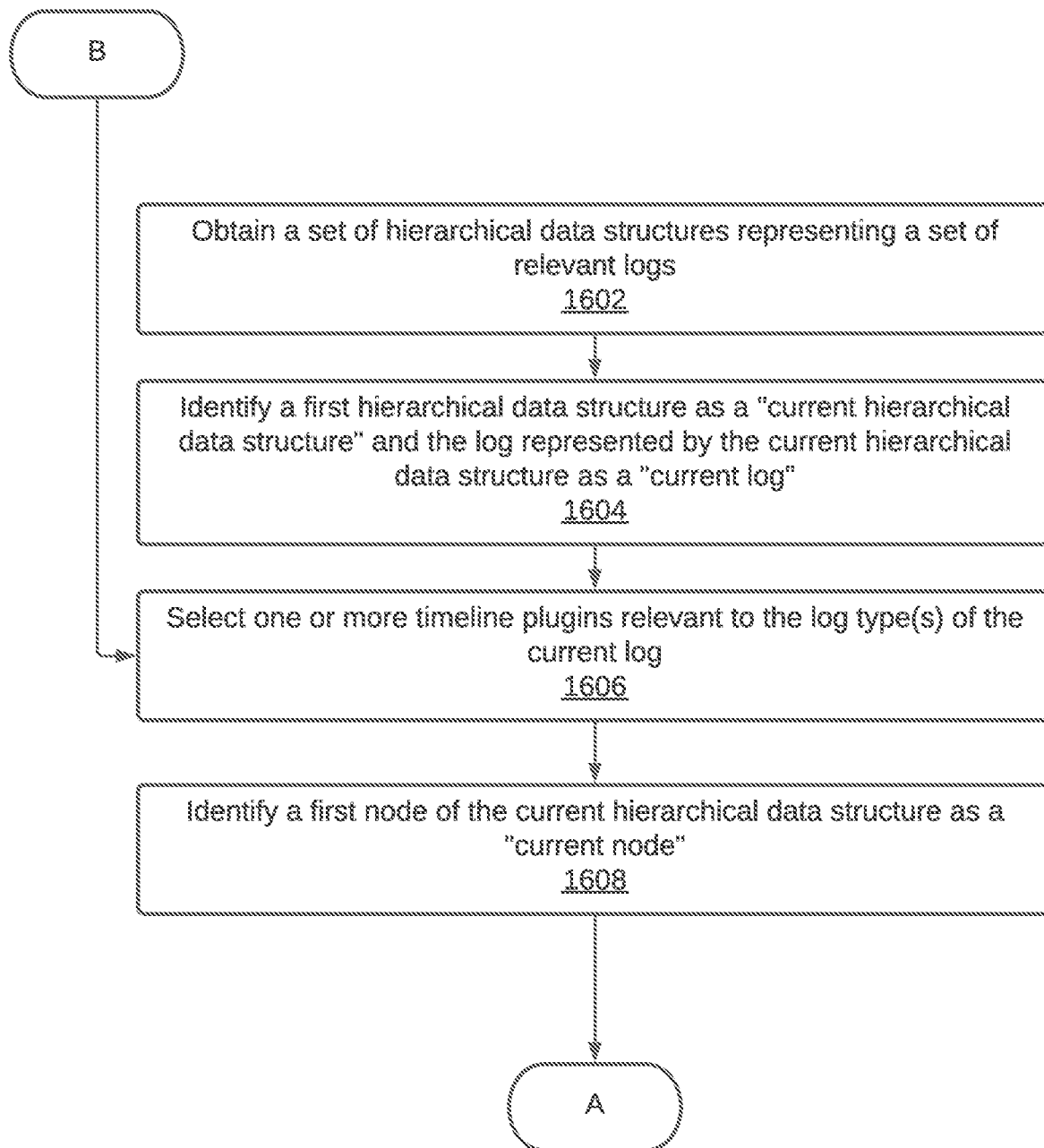
FIGS. 16A-16B illustrate an example set of operations for generating a timeline data structure in accordance with one or more embodiments.
Figure 16B:
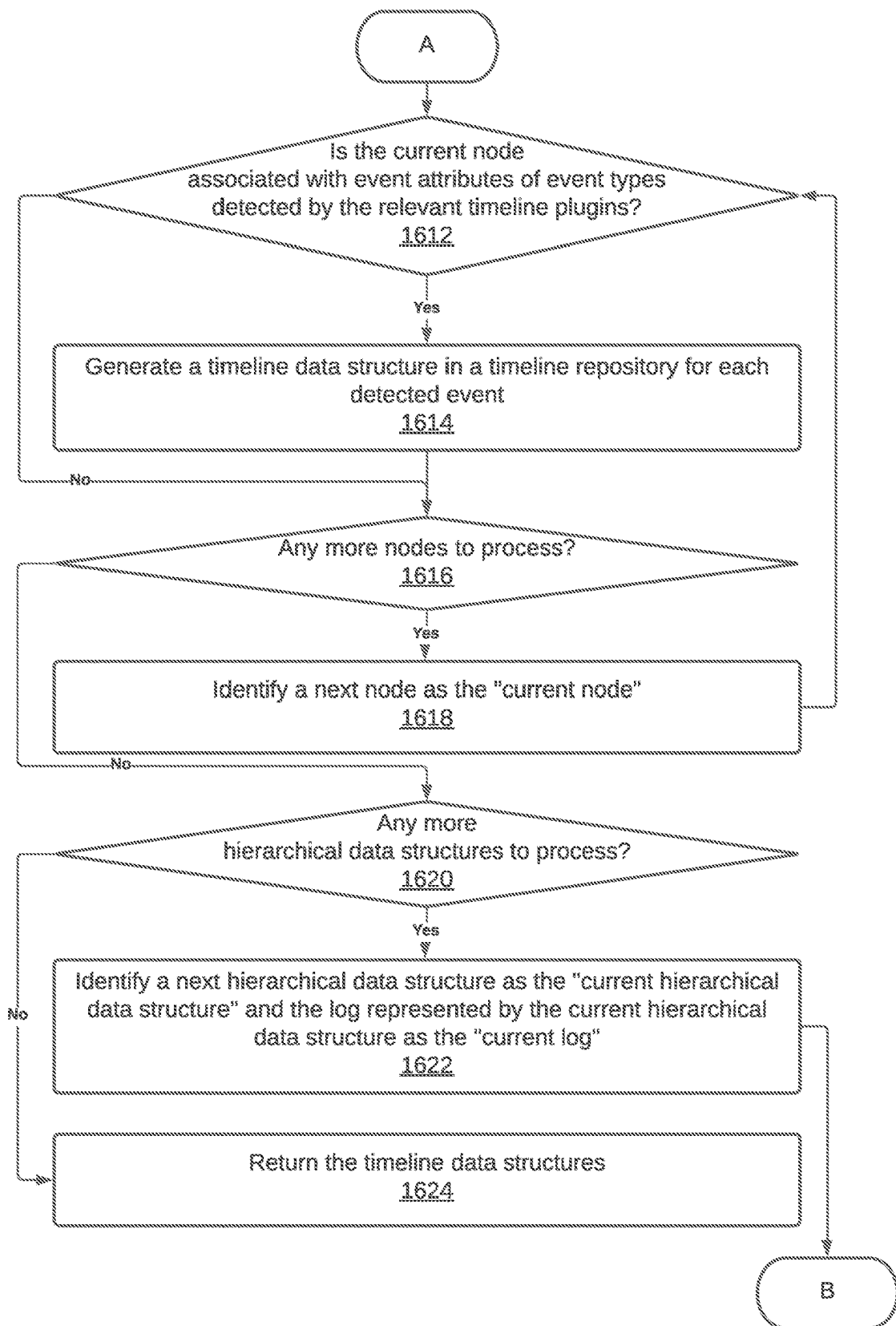
Figure 17:
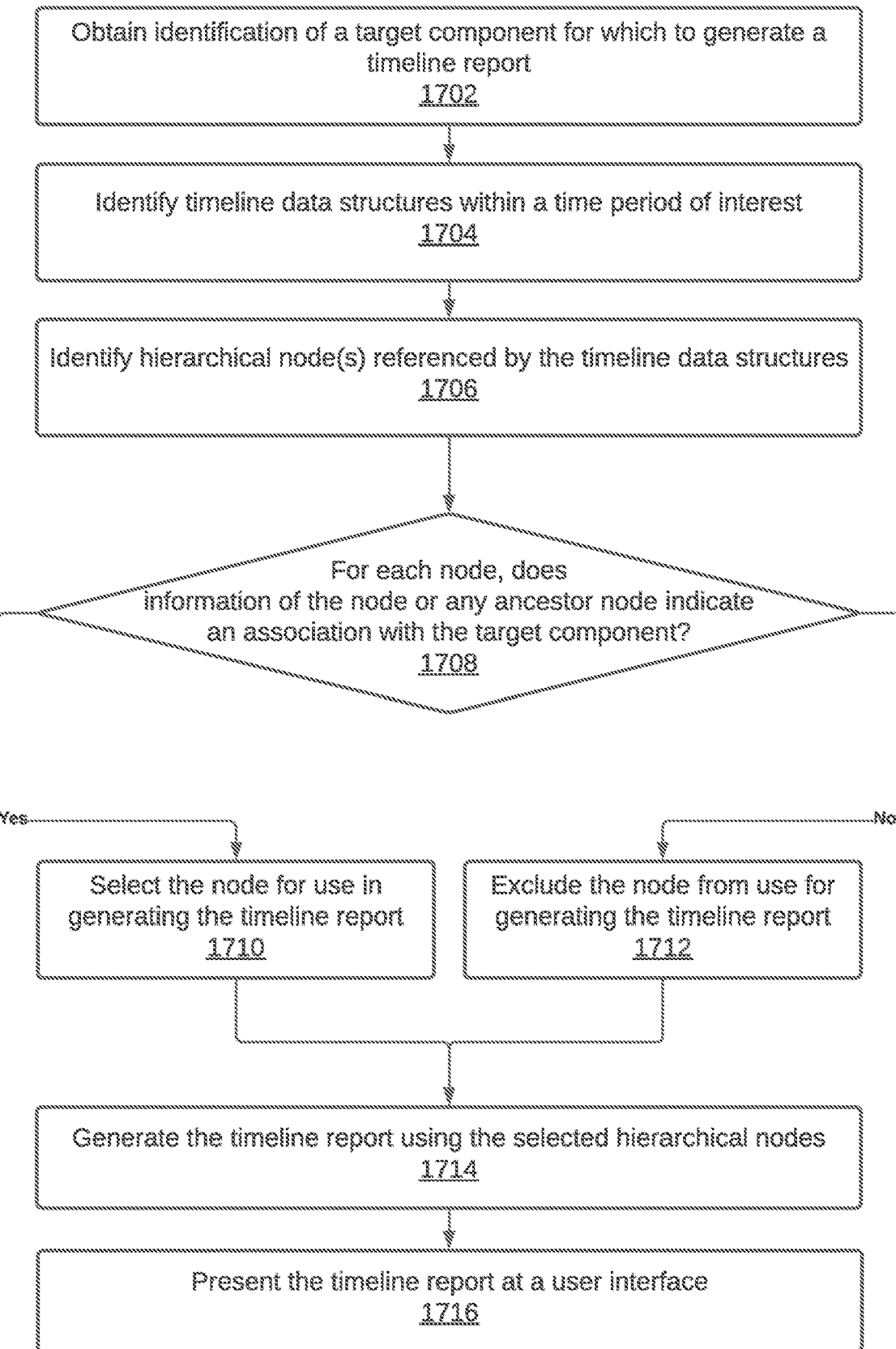
FIG. 17 illustrates an example set of operations for generating and presenting a report for a target component based on timeline data structures in accordance with one or more embodiments.

One or more operations illustrated in FIGS. 16A-17 may be modified, rearranged, or omitted all together. Accordingly, the particular sequence of operations illustrated in FIG. 2 should not be construed as limiting the scope of one or more embodiments.

FIGS. 16A-16B illustrate an example set of operations for generating a timeline data structure in accordance with one or more embodiments.

One or more embodiments include obtaining a set of hierarchical data structures representing a set of relevant logs (Operation 1602). A timeline engine obtains a set of hierarchical data structures representing a set of relevant logs. The relevant logs may be identified at Operation 1312 of FIG. 13. The hierarchical data structures may be generated via execution of the operations of FIG. 15 with respect to each relevant log.

One or more embodiments include identifying a first hierarchical data structure as a "current hierarchical data structure" and the log represented by the current hierarchical data structure as a "current log" (Operation 1604). The timeline engine identifies a first hierarchical data structure as a "current hierarchical data structure" and the log represented by the current hierarchical data structure as a "current log," thereby starting an iterative process.

One or more embodiments include selecting one or more timeline plugins relevant to the one or more log types of the current log (Operation 1606). The timeline engine identifies one or more log types of the current log. The log types of the current log may be identified at Operation 1402 of FIG. 14.

The timeline engine identifies a pool of timeline plugins, each associated with a respective log type. The timeline engine selects a subset of timeline plugins, from the pool of timeline plugins, that are associated with the log types of the current log. The selected timeline plugins may be referred to as the "relevant timeline plugins."

One or more embodiments include identifying a first hierarchical node of the current hierarchical data structure as a "current node" (Operation 1608). The timeline engine identifies a first hierarchical node of the current hierarchical data structure as a "current node."

One or more embodiments include determining whether the current node is associated with event attributes of event types detected by the relevant timeline plugins (Operation 1612). The timeline engine executes each of the relevant timeline plugins. Each timeline plugin is configured to detect events of respective event types. Each timeline plugin specifies a set of event attributes of the event type detected by the timeline plugin. The timeline engine determines compares information (data, metadata, and/or analysis data) of the current node to the event attributes specified by the relevant timeline plugins. The timeline engine determines whether the information of the current node matches the event attributes specified by the relevant timeline plugins. For example, the timeline engine determines whether data of the current node includes a text string specified by a timeline plugin, or whether data of the current node conforms to a text pattern specified by the timeline plugin.

For any matches between the current node and event attributes specified by the relevant timeline plugins, one or more embodiments include generating a timeline data structure in a timeline repository for the detected event (Operation 1614). For a match between the current node and event attributes specified by a particular timeline plugin, the timeline engine generates a new timeline data structure for an event of the event type associated with the particular timeline plugin. Generating a timeline data structure involves creating a new data structure, which may be, for example, a new object in heap, a new table entry, a new linked list, a new database record. The new timeline data structure includes (a) a reference to the current node and (b) a reference to the event type associated with the particular timeline plugin. The timeline engine stores the new timeline data structure into a timeline repository. Timeline data structures generated based on hierarchical data structures representing different logs may be stored into the same timeline repository.

The timeline engine further stores a time of the timeline data structure into the timeline data structure. In an embodiment, the timeline engine (and/or the hierarchy building engine) first determines a time of a hierarchical node referenced by the timeline data structure. A time of a hierarchical node is determined using timestamps within the current log (including timestamps within the log portion included as data of the referenced hierarchical node, if any), and/or line numbers of the log portion included as data of the referenced hierarchical node. In an example, a log includes a timestamp of 12:00 pm at line 10 of the log. The log includes a timestamp of 1:00 pm at line 40 of the log. Based on the timestamps and line numbers, each line of the log may be estimated to represent 2 minutes. Data of a hierarchical node may include a log portion ranging from line 16 to line 18. Based on the estimated 2 minutes per line, lines 16 to 18 are estimated to correspond to the time period 12:12 pm to 12:16 pm. Hence, a timeline data structure referencing the hierarchical node would be associated with the same time period of 12:12 pm to 12:16 pm. In another example, a log includes a timestamp of 12:00 pm at line 10 of the log. The log includes a timestamp of 1:00 pm at line 40 of the log. Based on the timestamps and line numbers, each line of the log may be estimated to represent 2 minutes. Data of a hierarchical node may include a log portion ranging from line 16 to line 18. Different from the first example, the log portion also includes a timestamp at line 16 that indicates 12:13 pm. Hence, the time of the hierarchical node is determined based on both the timestamp within the log portion and the estimation of 2 minutes per line. The start time of the hierarchical node would match the timestamp at the starting line, which is 12:13 pm. Then the end time of the hierarchical node would be deduced using the estimated 2 minutes per line, and hence determined as 12:17 pm. Therefore, a timeline data structure referencing the hierarchical node would be associated with the time period 12:13 pm to 12:17 pm.

One or more embodiments include determining whether there are any more nodes to process (Operation 1616). The timeline engine determines whether the current hierarchical data structure includes any hierarchical nodes not yet traversed by the relevant timeline plugins.

If there is another node to process, one or more embodiments include identifying a next node as the "current node" (Operation 1618). The timeline engine identifies a next hierarchical node of the current hierarchical data structure for processing. The next hierarchical node may be a child node or a sibling node to the current node. The next hierarchical node is now the "current node." The timeline engine then reiterates Operations 1612-1618 with respect to the current node.

One or more embodiments include determining whether there are any more hierarchical data structures to process (Operation 1620). The timeline engine determines whether the set of hierarchical data structures received at Operation 1602 includes any hierarchical data structures not yet processed.

If there is another hierarchical data structure to process, one or more embodiments include identifying a next hierarchical data structure as the "current hierarchical data structure" and the log represented by the current hierarchical data structure as the "current log" (Operation 1622). The timeline engine identifies a next hierarchical data structure for processing. The next hierarchical node is now the "current hierarchical data structure." The timeline engine then reiterates Operations 1606-1622 with respect to the current hierarchical data structure.

If all hierarchical nodes of the current hierarchical data structure are traversed by the relevant timeline plugins, and there are no more hierarchical data structures to process, one or more embodiments include returning the timeline data structures (Operation 1624). The timeline engine returns the timeline data structures representing events of various event types detected within hierarchical nodes of the hierarchical data structures.

FIG. 17 illustrates an example set of operations for generating and presenting a report for a target component based on timeline data structures in accordance with one or more embodiments.

One or more embodiments include obtaining identification of a target component for which to generate a timeline report (Operation 1702). A timeline engine (and/or a separate engine of a log analysis system) obtains identification of a target component for which to generate a timeline report. The identification of the target component may be entered via a user interface by a user and/or specified by an application.

One or more embodiments include identifying timeline data structures within a time period of interest (Operation 1704). The timeline engines obtains a time period of interest. The timeline period of interest may be entered via a user interface by a user and/or specified by an application. Alternatively, if no time period of interest is used, a default time period may be used.

The timeline engine determines identifies a set of timeline data structures stored in a timeline repository. The timeline engine identifies a time of each timeline data structure. The timeline data structures may be generated based on the operations of FIGS. 16A-16B. The timeline engine identifies subset of timeline data structures whose times are within the time period of interest.

One or more embodiments include identifying one or more hierarchical nodes referenced by the timeline data structures (Operation 1706). The timeline engine identifies one or more hierarchical nodes referenced by the timeline data structures identified at Operation 1704. The referenced hierarchical nodes may be within the same hierarchical data structure and/or different hierarchical data structures.

One or more embodiments include traversing each hierarchical node to determine whether information (data, metadata, and/or analysis data) of the hierarchical node or any ancestor node indicate an association with the target component (Operation 1708). The timeline engine traverses each referenced hierarchical node identified at Operation 1706.

The timeline engine identifies the information of a current hierarchical node that is being traversed. The information may include data, metadata, and/or analysis data of the current hierarchical node. The timeline engine determines whether any of the information indicates an association with the target component. As an example, the timeline engine may parse the data of the current hierarchical node to search for an identifier of the target component. The timeline engine may also determine whether the keys of the metadata and/or analysis data of the current hierarchical node include a component key. The timeline engine may determine whether a value for the component key references the target component. If the timeline engine finds an identifier and/or reference to the target component within the data, metadata, and/or analysis data of the current hierarchical node, then the timeline engine determines that the current hierarchical node has an association with the target component.

The timeline engine identifies ancestor nodes to the current hierarchical node. The timeline engine analyzes each ancestor node in the same manner that the current hierarchical node is analyzed, as described above. If the timeline engine finds an identifier and/or reference to the target component within the data, metadata, and/or analysis data of a particular ancestor node to the current hierarchical node, then the timeline engine determines that the current hierarchical node has an association with the target component.

For each referenced hierarchical node that indicates an association with the target component, one or more embodiments include selecting the hierarchical node for use in generating the timeline report (Operation 1710). The timeline engine selects hierarchical nodes that indicate an association with the target component, as determined at Operation 1708, for use in generating the desired timeline report.

If metadata of neither the node nor an ancestor node of the node indicates an association with the target component, one or more embodiments include excluding the node from use in generating the timeline report (Operation 1712). The timeline engine excludes hierarchical nodes that do not indicate an association with the target component, as determined at Operation 1708, for use in generating the desired timeline report.

One or more embodiments include generating the timeline report using the selected hierarchical nodes (Operation 1714). The timeline engine identifies each timeline data structure that references hierarchical nodes selected at Operation 1710. Timeline data structures not referencing the selected hierarchical nodes are not identified. The timeline engine uses the identified timeline data structures to generate the desired timeline report.

As an example, a desired timeline report may be a number of events associated with a target component over a time period of interest. The timeline engine may determine a count of the timeline data structures at each time interval within the time period of interest. The timeline engine may plot the counts in a line graph.

As another example, a desired timeline report may be a particular metric associated with events associated with a target component over a time period of interest. The timeline engine may traverse each identified timeline data structure.

For a current timeline data structure being processed, the timeline engine may determine whether information of the referenced hierarchical node and/or any ancestor nodes indicates a value for the particular metric. The timeline engine may insert, into a line graph, a data point indicating the value for the particular metric at the time of the current timeline data structure. The timeline engine thereby inserts various data points based on the identified timeline data structure to generate the desired timeline report.

As described, the timeline engine may include a particular timeline data structure into a timeline report for the target component based on information of an ancestor node to the referenced hierarchical node. Therefore information of an ancestor node is imputed not only to a descendant node but also to a timeline data structure referencing the descendant node.

One or more embodiments include presenting the timeline report at a user interface (Operation 1716). The timeline engine presents the timeline report at a user interface. A line graph, or other type of graph and/or report, may be presented at the user interface.

In one or more embodiments, additional and/or alternative types of timeline reports may be generated. In an embodiment, a timeline report associated with a target metric may be desired. As an example, a timeline report showing a number of events associated with a target metric being above a particular threshold may be desired. As another example, a timeline report showing events that satisfy target criteria may be desired.

A timeline engine identifies hierarchical nodes referenced by timeline data structures within a time period of interest. For each identified hierarchical node, the timeline engine determines whether information of the hierarchical node and/or ancestor nodes satisfies the target criteria. For example, the timeline engine may determine whether information of the hierarchical node and/or ancestor nodes indicate that the target metric has exceeded a particular threshold. If information of the hierarchical node and/or ancestor nodes satisfies the target criteria, then the timeline engine determines that the hierarchical node is associated with a fulfillment of the target criteria. The timeline engine selects the hierarchical nodes associated with a fulfillment of the target criteria. The timeline engine selects the timeline data structures referencing the selected hierarchical nodes. The timeline engine uses the selected timeline data structures to generate the desired timeline report.

Figure 18A:
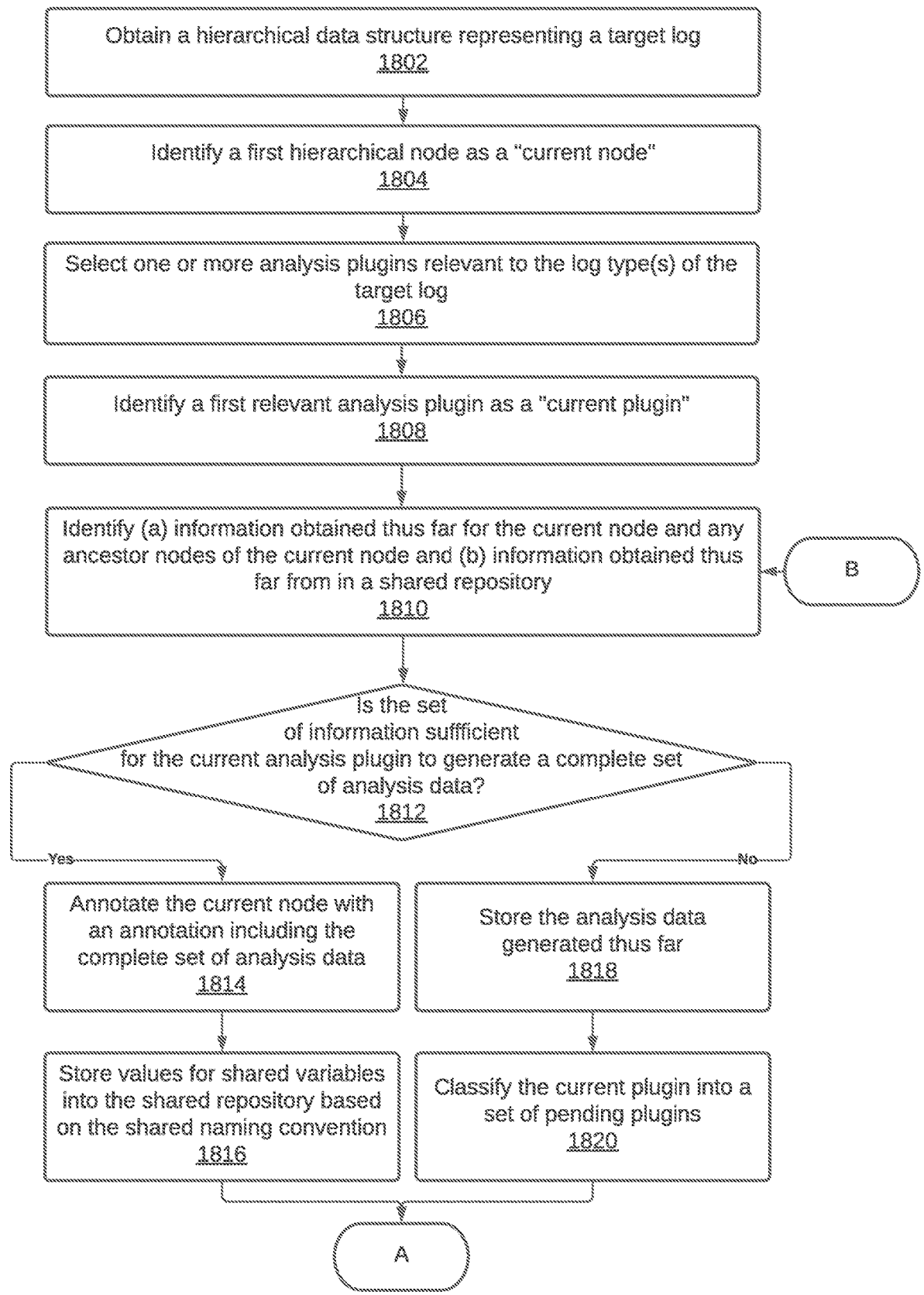
FIGS. 18A-18B illustrate an example set of operations for generating a hierarchical data structure including analysis data in accordance with one or more embodiments.
Figure 18B:
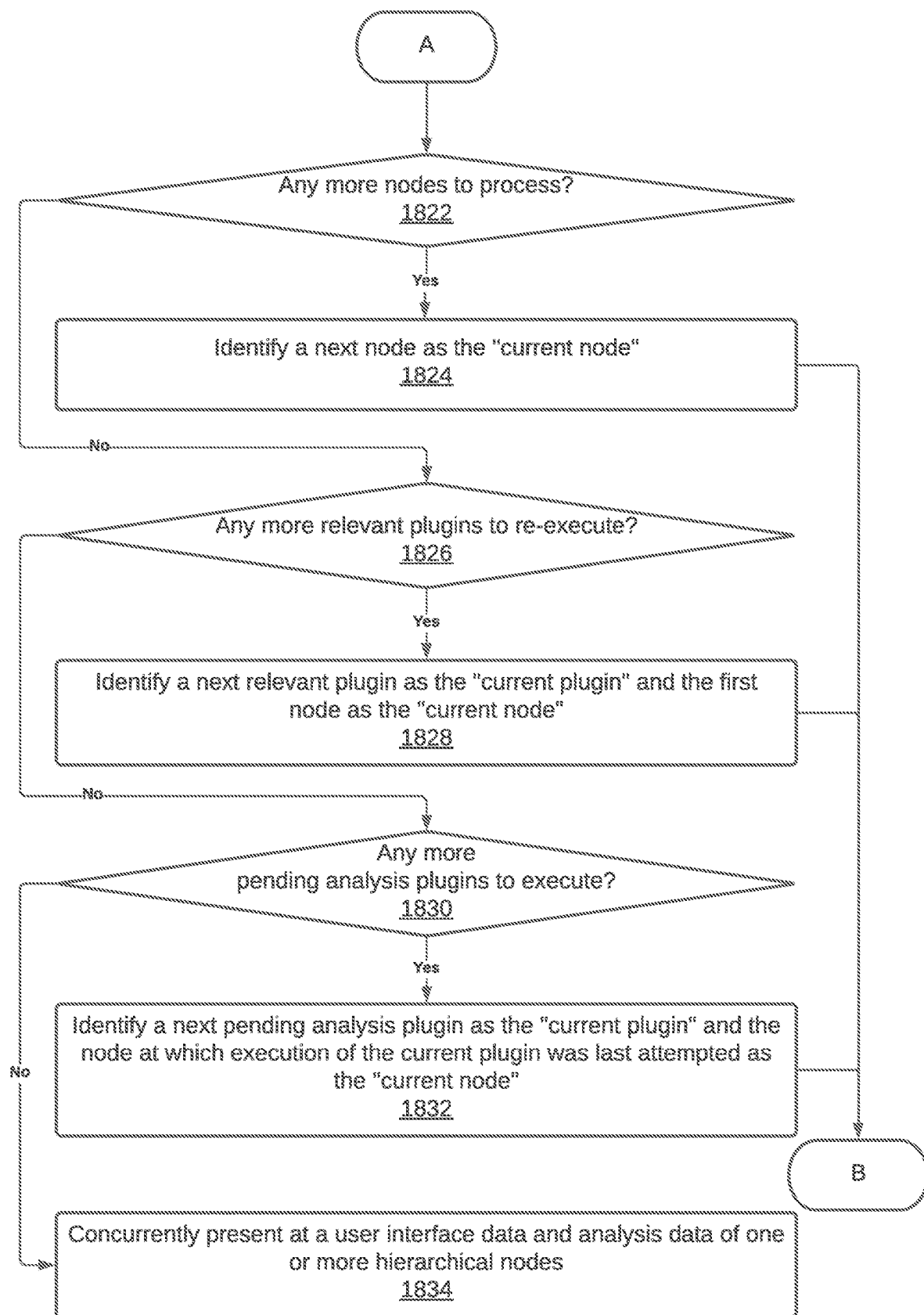

5. Collaboratively Executing Plugins to Generate a Hierarchical Data Structure One or more operations illustrated in FIGS. 18A-18B may be modified, rearranged, or omitted all together. Accordingly, the particular sequence of operations illustrated in FIGS. 18A-18B should not be construed as limiting the scope of one or more embodiments. FIGS. 18A-18B illustrate an example set of operations for generating a hierarchical data structure including analysis data in accordance with one or more embodiments.

One or more embodiments include obtaining a hierarchical data structure representing a target log (Operation 1802). An analysis engine obtains a hierarchical data structure representing a target log. The hierarchical data structure may be generated via execution of the operations of FIG. 15 with respect to the target log.

One or more embodiments include identifying a first hierarchical node as a "current node" (Operation 1804). The analysis engine identifies a first hierarchical node as a "current node," thereby starting an iterative process.

One or more embodiments include selecting one or more analysis plugins relevant to the one or more log types of the target log (Operation 1806). The analysis engine identifies one or more log types of the target log. The log types of the target log may be identified at Operation 1402 of FIG. 14.

The analysis engine identifies a pool of analysis plugins, each associated with a respective log type. The analysis engine selects a subset of analysis plugins, from the pool of analysis plugins, that are associated with the log types of the target log. The selected analysis plugins may be referred to as the "relevant analysis plugins."

One or more embodiments include identifying a first relevant analysis plugin as a "current plugin" (Operation 1808). The analysis engine identifies a first relevant analysis plugin as a "current plugin."

The analysis engine does not necessarily determine a sequence of execution of the relevant analysis plugin based on the dependencies amongst the relevant analysis plugins. The analysis engine's selection of the first analysis plugin for traversal does not necessarily depend on dependencies of the first analysis plugin. In an embodiment, there is no specification of the dependencies amongst the analysis plugins.

One or more embodiments include identifying (a) information (data, metadata, and analysis data) obtained thus far for the current node and any ancestor nodes of the current node and (b) information obtained thus far from a shared repository using a shared naming convention (Operation 1810). The analysis plugin identifies information (data, metadata, and analysis data) obtained thus far for the current node. The analysis plugin also identifies information obtained thus far for each ancestor node to the current node. As an example, a hierarchical node may be stored as an object within a heap. A respective field of the object may reference data, metadata, and analysis data of the hierarchical node. An analysis plugin may retrieve information from the respective fields to obtain the data, metadata, and analysis data of the hierarchical node. As another example, data may be stored within a body of a hierarchical node, while metadata and analysis data may be stored as annotations to the hierarchical node. An analysis plugin may retrieve information from the body and the annotations of the hierarchical node.

Additionally or alternatively, the analysis plugin identifies information obtained thus far from a shared repository. Values for keys stored in the shared repository may be determined by another plugin, which may be an analysis plugin and/or another type of plugin. Values for keys stored in the shared repository may be determined based on information of the current node and/or other hierarchical nodes and/or other hierarchical data structures.

One or more embodiments include determining whether the set of information is sufficient for the current analysis plugin to generate a complete set of analysis data (Operation 1812). The analysis plugin identifies a set of inputs to the current plugin. The inputs may include, for example, method parameters specified in a method signature of the current plugin, any values retrieved in using get methods within a method body of the current plugin, and/or any value that is generated external to the current plugin and used by the current plugin. The analysis plugin identifies keys names of the inputs, as specified by the current plugin. The keys names specified by the current plugin are prescribed by a shared naming convention governing the plugins that have access to the shared data repository. The analysis plugin searches for keys of the identified key names in the information identified at Operation 1810. If a key of an identified key name is not found, or a value for a key of an identified key name is not found, then the analysis engine determines that the set of information identified at Operation 1810 is not sufficient for the current analysis plugin to generate a complete set of analysis data. Conversely, if values for keys for all identified key names are found, then the analysis engine determines that the set of information identified at Operation 1810 is sufficient for the current analysis plugin to generate a complete set of analysis data.

In one or more embodiments, the analysis plugin searches for a key as key names are identified during execution of the current plugin. The analysis plugin searches for the key in the information of the current node and ancestor nodes, and in the information stored in the shared repository. If a value for the key is found, then the analysis plugin uses the previously-determined value for the key to continue execution. But if a value for the key is not found, then the analysis engine determines that the current analysis plugin is not able to generate a complete set of analysis data. Regardless of whether the key is found, the analysis engine may attempt to continue execution of the analysis plugin. The analysis engine may attempt to continue execution of operations that do not require the missing key. The analysis engine may generate an incomplete set of analysis data based on the subset of operations that are successfully executed.

When determining whether the current analysis plugin is able to generate a complete set of analysis data for the current node, the current plugin does not search information of hierarchical nodes that do not have an ancestor relationship with the current node. Accessibility restrictions may prevent the current analysis plugin from accessing information of hierarchical nodes that do not have an ancestor relationship with the current node. If the current plugin attempts to access information of hierarchical nodes that do not have an ancestor relationship with the current node, an error or warning may be generated.

If a complete set of analysis data is generated, one or more embodiments include annotating the current node with an annotation including the complete set of analysis data (Operation 1814). The analysis engine annotates the current node with the complete set of analysis data. In an embodiment, the analysis engine generates a data structure representing the annotation. The analysis engine stores an association between the data structure representing the current node and the data structure representing the annotation. The analysis engine stores the analysis data within the annotation. In another embodiment, the analysis engine identifies an existing annotation to the current node. The existing annotation may include metadata and/or analysis data of the current node; the metadata and/or analysis data in the existing annotation may have been previously generated by a different analysis plugin or other type of plugin. The analysis engine adds the analysis data from the current analysis plugin to the existing annotation.

As described above, the current analysis plugin may obtain an input value from information of an ancestor node to the current node. The current analysis plugin may determine an output value based on the information of an ancestor node to the current node. The current analysis plugin may store the output value as analysis data of the current node. Therefore, information of ancestor nodes may be used for determining information of a descendant node. However, information of non-ancestor nodes are not used for determining information of a descendant node.

Further, as described above, the current analysis plugin may obtain an input value from information in a shared repository during execution with respect to the current node. The information in the shared repository may be determined by a different plugin executing with respect to a different hierarchical node that has no ancestor or descendant relationship with the current node. The current analysis plugin may determine an output value based on the information in the shared repository. The current analysis plugin may store the output value as analysis data of the current node. Therefore, output values stored in a shared repository, even if generated from analyzing non-ancestor nodes, may be used for determining information of a descendant node. However, output values not stored in a shared repository, and not within information of ancestor nodes, cannot be used for determining information of a descendant node.

One or more embodiments include storing values for shared keys into a shared repository based on a shared naming convention (Operation 1816). The analysis engine stores values for shared keys into the shared repository. The analysis engine stores the shared keys using key names specified by the current analysis plugin. The keys names specified by the current analysis plugin are governed by the shared naming convention.

If a complete set of analysis data is generated at Operation 1812, one or more embodiments include storing the analysis data generated thus far (Operation 1818). The analysis engine stores any values for keys determined thus far. The analysis engine may store the incomplete analysis data as an incomplete annotation to the current node. Additionally or alternatively, the analysis engine may store the incomplete analysis data into a temporary memory storage. The analysis engine may subsequently retrieve the analysis data from the temporary storage and append additional analysis data, for storage as an annotation to the current node.

One or more embodiments include classifying the current plugin into a set of pending plugin (Operation 1820). If the analysis engine determines that the current analysis plugin cannot generate a complete set of analysis data, the analysis engine classifies the current analysis plugin as pending with respect to the current node. The analysis engine may add a pending flag to the current analysis plugin to indicate that the current analysis plugin is pending with respect to the current node. Additionally or alternatively, the analysis engine may insert an entry to a list of pending plugins, indicating that the current analysis plugin is pending with respect to the current node.

One or more embodiments include determining whether there are any more hierarchical nodes to process (Operation 1822). The analysis engine determines whether the hierarchical data structure includes any hierarchical nodes not yet traversed by the current analysis plugin.

If there is another node to process, one or more embodiments include identifying a next node as the "current node" (Operation 1824). The analysis engine identifies a next hierarchical node of the hierarchical data structure for processing. The next hierarchical node may be a child node or a sibling node to the current node. The next hierarchical node is now the "current node." The analysis engine then reiterates Operations 1810-1822 with respect to the current node.

One or more embodiments include determining whether there are any more relevant analysis plugins to re-execute (Operation 1826). The analysis engine determines whether any of the set of relevant analysis plugins identified at Operation 1806 have not yet been executed.

If a relevant analysis plugin remains unprocessed, one or more embodiments include identifying a next relevant analysis plugin as the "current plugin" and the first hierarchical node as the "current node" (Operation 1828). The analysis engine identifies a next relevant analysis plugin for execution. The next analysis plugin is now the "current plugin." The analysis engine also identifies the first hierarchical node as the "current node." The analysis engine then reiterates Operations 1810-1822 using the current plugin with respect to the current node.

One or more embodiments include determining whether there are any more pending analysis plugins to execute (Operation 1830). The analysis engine determines whether any of the pending analysis plugins identified at Operation 1820 need re-execution.

One or more embodiments include identifying a next pending analysis plugin as the "current plugin" and the node at which execution of the current plugin was last attempted as the "current node" (Operation 1832). The analysis engine identifies a next pending analysis plugin for execution. The next analysis plugin is now the "current plugin." The analysis engine identifies the node at which execution of the current plugin was last attempted as the "current node." The analysis engine then reiterates Operations 1810-1822 using the current plugin with respect to the current node.

As an example, a particular analysis plugin is configured to obtain a value for a first input key to generate a value for a first output key, and to obtain a value for a second input key to generate a value for a second output key.

An analysis engine may attempt a first execution of the particular analysis plugin with respect to a current node of a hierarchical data structure. The analysis engine may search for the value for the first input key from information of the current node, information of ancestor nodes to the current node, and information in a shared repository. The analysis engine may find the value for the first input key in metadata of a particular ancestor node. The analysis engine may successfully determine the value of the first output key. The analysis engine may annotate the current node with an annotation including the value of the first output key.

The analysis engine may also search for the value for the second input key from information of the current node, information of ancestor nodes to the current node, and information in a shared repository. The analysis engine is unable to find the value for the second input key in any of the information. The analysis engine cannot determine a value for the second output key.

The analysis engine classifies the particular analysis plugin as pending with respect to the current node. The analysis engine may then execute other analysis plugins with respect to one or more hierarchical nodes of the hierarchical data structure. The analysis engine may then determine whether there are any pending analysis plugins to re-execute. The exact sequence in which analysis plugins (whether classified as pending or not) are executed is not significant. At some time, the analysis engine may attempt a second execution of the particular analysis plugin. The analysis engine searches for the value for the second input key from information of the current node, information of ancestor nodes to the current node, and information in a shared repository. Now the analysis engine is able to find the value for the second input key in analysis data of another ancestor node. The analysis engine successfully determines a value for the second output key. The analysis engine may add, to the previously-created annotation to the current node, the value for the second output key.

If the relevant analysis plugins complete execution with respect to each hierarchical node of the hierarchical data structure, one or more embodiments include concurrently presenting, at a user interface, data and analysis data of one or more hierarchical nodes (Operation 1834). The analysis engine concurrently displays on a user interface (a) data of one or more hierarchical nodes and (b) analysis data of the hierarchical nodes. The data and the analysis data may be placed side-by-side with each other. Hence, a user may concurrently view (a) a portion of a log, which is the data of a particular node, and (b) analysis data that is generated based on another portion of the log, which is the data of another node. Since the two portions may be many lines apart within the log, a user looking at the log itself may have difficulty interpreting the two portions together. The user interface that concurrently presents data and analysis data of the particular node allows a user to easily view analysis generated based on two separate portions of a log.

6. Example Embodiment

Referring back to FIG. 5, an example process for generating a hierarchy data structure 512 based on a log 502 may be described. The example is described for purposes of clarity. Components and/or operations described below should be understood as specific examples which may not be applicable to certain embodiments. Accordingly, components and/or operations described below should not be construed as limiting the scope of any of the claims.

A hierarchy building engine executes a set of pre-processing plugins to generate a hierarchical data structure 512 representing a log 502 generated by one or more components of a computer network.

Initially, a root hierarchical node is generated. As illustrated, the root hierarchical node is node 514a. Data of the root hierarchical node includes portions 504a-504d of the log 502. Each of a set of pre-processing plugins are executed with respect to the root hierarchical node. Executing a plugin with respect to a hierarchical node includes: (a) determining whether any portion of the log 502 matches a set of information attributes, and generating a new hierarchical node for any recognized information, and (b) determining values for a set of keys based on the data of the new hierarchical node, and storing the values for the keys as metadata of the new hierarchical node and/or into a shared repository.

A hierarchy building engine selects a first pre-processing plugin, from a pool of relevant pre-processing plugins, for execution. The sequence in which the pool of relevant pre-processing plugins is executed is not necessarily based on any dependencies amongst the pre-processing plugins. The hierarchy building engine executes the first pre-processing plugin with respect to each node in the hierarchical data structure 512, which at this time includes only node 514a. The hierarchy building engine analyzes the data of node 514a, which at this time includes portions 504a-504d of log 502. The hierarchy building engine determines that portion 504a matches a set of information attributes specified by the first pre-processing plugin. Based on the specification of the first pre-processing plugin, the hierarchical building engine creates two new child nodes. Data of the new child node, which is node 514b, includes portion 504a. Data of the other new child node (not illustrated) includes the remainder of the log 502, which includes portions 504b-504d. Node 514a becomes an anchor node and is no longer associated with any portions of log 502. Moreover, the hierarchical building engine determines values for a set of keys, specified by the first pre-processing plugin, based at least on the data of node 514*b*. The hierarchical building engine stores the determined values for the keys as metadata 516*b* of node 514*b* and/or into the shared repository, based on the specifications of the first pre-processing plugin.

The hierarchy building engine executes a second pre-processing plugin with respect to each node in the hierarchical data structure 512, which now includes node 514*a*, node 514*b*, and a third node including portions 504*b*-504*d*. The hierarchy building engine does not recognize any information in the data of node 514*b* based on the second pre-processing plugin. The hierarchy building engine then analyzes the node including portions 504*b*-504*d*. The hierarchy building engine determines that a particular portion matches information attributes specified by the second pre-processing plugin. The particular portion that is recognized includes portions 504*b*-504*c*. Based on the specification of the second pre-processing plugin, the hierarchy building engine creates a new child node and a new sibling node. Data of the new child node (not illustrated) includes portions 504*b*-504*c*. Data of the new sibling node, which is node 514*d*, includes the recognized portion 504*d*. The hierarchy building engine determines values for a set of keys, specified by the second pre-processing plugin, based at least on the data of the new node, which includes portions 504*b*-504*c*. The hierarchy building engine stores determined values for the keys as metadata of the new node and/or into the shared repository, based on the specifications of the second pre-processing plugin.

The hierarchy building engine executes a third pre-processing plugin with respect to each node in the hierarchical data structure 512, which now includes node 514*a*, node 514*b*, node 514*d*, and a fourth node including portions 504*b*-504*c*. The hierarchy building engine recognizes the data of node 514*d* based on the third pre-processing plugin. The hierarchy building engine determines values for a set of keys, specified by the third pre-processing plugin, based at least on the data of node 514*d*. The hierarchy building engine stores determined values for the keys as metadata 516*d* of node 514*d* and/or into the shared repository, based on the specifications of the third pre-processing plugin.

The hierarchy building engine executes a fourth pre-processing plugin with respect to each node in the hierarchical data structure 512, which now includes node 514*a*, node 514*b*, node 514*d*, and a fourth node including portions 504*b*-504*c*. The hierarchy building engine analyzes the data of the node including portions 504*b*-504*c*. The hierarchy building engine recognizes each of portions 504*b*-504*c* based on the fourth pre-processing plugin. The hierarchy building engine creates two child nodes based on the fourth pre-processing plugin. Data of one new child node, which is node 514*e*, includes portion 504*b*. Data of the other new child node, which is node 514*f*, includes portion 504*c*. The hierarchy building engine determines a set of values for a set of keys, specified by the fourth pre-processing plugin, based at least on the data of node 514*e*. The values for the keys are stored as metadata 516*e* of node 514*e* and/or into the shared repository. Additionally, the hierarchy building engine determines another set of values for the set of keys, specified by the fourth pre-processing plugin, based at least on the data of node 514*f*. The values for the keys are stored as metadata 516*f* of node 514*f* and/or into the shared repository.

Therefore, the hierarchical data structure 512 as illustrated in FIG. 5 is generated. Other ways of generating the hierarchical data structure 512 may be used. Additionally or alternatively, other hierarchical data structures may be generated.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 19:
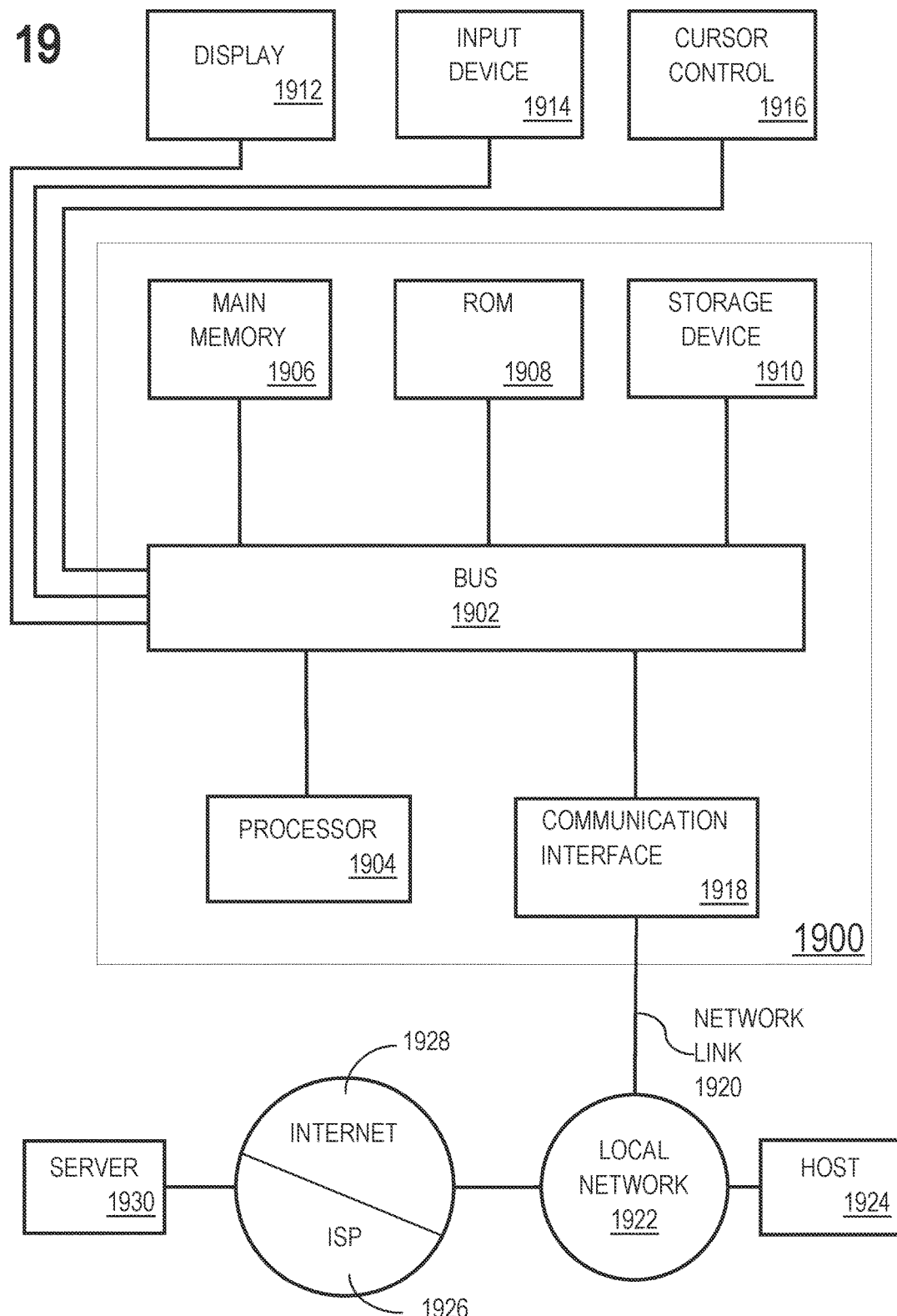
FIG. 19 shows a block diagram that illustrates a computer system in accordance with one or more embodiments.

For example, FIG. 19 is a block diagram that illustrates a computer system 1900 upon which an embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in non-transitory storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1910. Volatile media includes dynamic memory, such as main memory 1906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
    generating a root node of a hierarchical data structure that represents a target log;
    determining that a subset of pre-processing plugins, in a pool of pre-processing plugins configured to pre-process log data, is relevant to a log type of the target log;
    generating, at least by executing a first pre-preprocessing plugin in the subset of pre-processing plugins determined to be relevant to the log type of the target log, a first hierarchical node for the hierarchical data structure based on at least a first portion of the target log;
    generating, at least by executing a second pre-preprocessing plugin in the subset of pre-processing plugins determined to be relevant to the log type of the target log, a second hierarchical node for the hierarchical data structure based on at least a second portion of the target log.

2. The one or more non-transitory machine-readable media of claim 1, the operations further comprising:
    storing, as data of the root node, data from the target log.

3. The one or more non-transitory machine-readable media of claim 2, the operations further comprising:
    determining that a first subset of the data of the root node matches one or more information attributes specified by the first pre-processing plugin;
    wherein generating the first hierarchical node is performed responsive to determining that the first subset of the data of the root node matches the one or more information attributes specified by the first pre-processing plugin.

4. The one or more non-transitory machine-readable media of claim 3, the operations further comprising:
    generating a third hierarchical node for the hierarchical data structure;
    storing, as data of the third hierarchical node, a second subset of the data of the root node that does not match the one or more information attributes specified by the first pre-processing plugin.

5. The one or more non-transitory machine-readable media of claim 4, the operations further comprising:
    determining that at least part of the data of the third hierarchical node matches one or more information attributes specified by the second pre-processing plugin;
    wherein generating the second hierarchical node is performed responsive to determining that at least part of the data of the third hierarchical node matches the one or more information attributes specified by the second pre-processing plugin.

6. The one or more non-transitory machine-readable media of claim 1, the operations further comprising:
    determining that every pre-processing plugin in the subset of pre-processing plugins determined to be relevant to the log type of the target log has been executed;
    responsive to determining that every pre-processing plugin in the subset of pre-processing plugins determined to be relevant to the log type of the target log has been executed, returning the hierarchical data structure.

7. The one or more non-transitory machine-readable media of claim 1, the operations further comprising:
    generating a first key associated with the first hierarchical node;
    storing one or more of metadata or analysis data associated with the target log as a first value for the first key;
    generating a second key associated with the second hierarchical node;
    storing one or more of metadata or analysis data associated with the target log as a second value for the second key.

8. A system comprising:
    at least one device comprising one or more hardware processors,
    the system being configured to perform operations comprising:
        generating a root node of a hierarchical data structure that represents a target log;
        determining that a subset of pre-processing plugins, in a pool of pre-processing plugins configured to pre-process log data, is relevant to a log type of the target log;
        generating, at least by executing a first pre-preprocessing plugin in the subset of pre-processing plugins determined to be relevant to the log type of the target log, a first hierarchical node for the hierarchical data structure based on at least a first portion of the target log;
        generating, at least by executing a second pre-preprocessing plugin in the subset of pre-processing plugins determined to be relevant to the log type of the target log, a second hierarchical node for the hierarchical data structure based on at least a second portion of the target log.

9. The system of claim 8, the operations further comprising:
storing, as data of the root node, data from the target log.

10. The system of claim 9, the operations further comprising:
determining that a first subset of the data of the root node matches one or more information attributes specified by the first pre-processing plugin;
wherein generating the first hierarchical node is performed responsive to determining that the first subset of the data of the root node matches the one or more information attributes specified by the first pre-processing plugin.

11. The system of claim 10, the operations further comprising:
generating a third hierarchical node for the hierarchical data structure;
storing, as data of the third hierarchical node, a second subset of the data of the root node that does not match the one or more information attributes specified by the first pre-processing plugin.

12. The system of claim 11, the operations further comprising:
determining that at least part of the data of the third hierarchical node matches one or more information attributes specified by the second pre-processing plugin;
wherein generating the second hierarchical node is performed responsive to determining that at least part of the data of the third hierarchical node matches the one or more information attributes specified by the second pre-processing plugin.

13. The system of claim 8, the operations further comprising:
determining that every pre-processing plugin in the subset of pre-processing plugins determined to be relevant to the log type of the target log has been executed;
responsive to determining that every pre-processing plugin in the subset of pre-processing plugins determined to be relevant to the log type of the target log has been executed, returning the hierarchical data structure.

14. The system of claim 8, the operations further comprising:
generating a first key associated with the first hierarchical node;
storing one or more of metadata or analysis data associated with the target log as a first value for the first key;
generating a second key associated with the second hierarchical node;
storing one or more of metadata or analysis data associated with the target log as a second value for the second key.

15. A method comprising:
generating a root node of a hierarchical data structure that represents a target log;
determining that a subset of pre-processing plugins, in a pool of pre-processing plugins configured to pre-process log data, is relevant to a log type of the target log;
generating, at least by executing a first pre-preprocessing plugin in the subset of pre-processing plugins determined to be relevant to the log type of the target log, a first hierarchical node for the hierarchical data structure based on at least a first portion of the target log;
generating, at least by executing a second pre-preprocessing plugin in the subset of pre-processing plugins determined to be relevant to the log type of the target log, a second hierarchical node for the hierarchical data structure based on at least a second portion of the target log;
wherein the method is performed by at least one device comprising one or more hardware processors.

16. The method of claim 15, further comprising:
storing, as data of the root node, data from the target log.

17. The method of claim 16, further comprising:
determining that a first subset of the data of the root node matches one or more information attributes specified by the first pre-processing plugin;
wherein generating the first hierarchical node is performed responsive to determining that the first subset of the data of the root node matches the one or more information attributes specified by the first pre-processing plugin.

18. The method of claim 17, further comprising:
generating a third hierarchical node for the hierarchical data structure;
storing, as data of the third hierarchical node, a second subset of the data of the root node that does not match the one or more information attributes specified by the first pre-processing plugin.

19. The method of claim 18, further comprising:
determining that at least part of the data of the third hierarchical node matches one or more information attributes specified by the second pre-processing plugin;
wherein generating the second hierarchical node is performed responsive to determining that at least part of the data of the third hierarchical node matches the one or more information attributes specified by the second pre-processing plugin.

20. The method of claim 15, further comprising:
determining that every pre-processing plugin in the subset of pre-processing plugins determined to be relevant to the log type of the target log has been executed;
responsive to determining that every pre-processing plugin in the subset of pre-processing plugins determined to be relevant to the log type of the target log has been executed, returning the hierarchical data structure.

* * * * *